(12) United States Patent
Fellner

(10) Patent No.: US 8,249,547 B1
(45) Date of Patent: Aug. 21, 2012

(54) EMERGENCY ALERT DEVICE WITH MOBILE PHONE

(76) Inventor: Albert Fellner, Lichtenberg (AT)

( * ) Notice: Subject to any disclaimer, the term of this patent is extended or adjusted under 35 U.S.C. 154(b) by 0 days.

(21) Appl. No.: 13/134,757

(22) Filed: Jun. 16, 2011

(51) Int. Cl.
*H04M 11/04* (2006.01)
(52) U.S. Cl. .............. 455/404.1; 455/556.1; 455/575.6
(58) Field of Classification Search ............ 455/404.1, 455/404.2, 414.1–414.4, 418–420, 456.1–457, 455/552.1, 553.1, 556.1–558, 566, 567, 569.1, 455/575.1–575.9; 340/287–309; 379/37–51
See application file for complete search history.

(56) References Cited

U.S. PATENT DOCUMENTS

| | | | |
|---|---|---|---|
| 5,008,864 A | 4/1991 | Yoshitake |
| 5,014,040 A | 5/1991 | Weaver et al. |
| 5,054,051 A | 10/1991 | Hoff |
| 5,274,613 A | 12/1993 | Seager |
| 5,652,570 A | 7/1997 | Lepkofker |
| 5,742,233 A | 4/1998 | Hoffman et al. |
| 5,790,022 A | 8/1998 | Delvecchio et al. |
| 5,838,237 A | 11/1998 | Revell et al. |
| 5,852,401 A | 12/1998 | Kita |
| 5,929,777 A | 7/1999 | Reynolds |
| 5,940,004 A | 8/1999 | Fulton |
| 6,035,035 A | 3/2000 | Firooz |
| 6,158,884 A | 12/2000 | Lebby et al. |
| 6,272,359 B1 | 8/2001 | Kivela et al. |
| 6,278,370 B1 | 8/2001 | Underwood |
| 6,310,539 B1 | 10/2001 | Rye et al. |
| 6,362,778 B2 | 3/2002 | Neher |
| 6,430,110 B2 | 8/2002 | Baroche |
| 6,464,390 B1 | 10/2002 | Baroche |
| 6,529,713 B1 | 3/2003 | Seymour |
| 6,535,605 B1 | 3/2003 | Ghassabian |

(Continued)

FOREIGN PATENT DOCUMENTS

DE 19803602 1/1998

(Continued)

OTHER PUBLICATIONS

LIS302DL brochure; 3-axis—2g/8g smart digital output "piccolo" accelerometer, Oct. 2007; www.st.com.

(Continued)

*Primary Examiner* — Kamran Afshar
*Assistant Examiner* — Kashif Siddiqui
(74) *Attorney, Agent, or Firm* — E. Victor Indiano; Indiano Law Gorup, LLC.

(57) ABSTRACT

A wearable emergency alert device includes a wearable member and a separately encased mobile phone member that is selectively attachable to the wearable member. The wearable member includes an attachment member for attaching the wearable member to a body part of the user, a first transmitter for sending a first signal to the mobile phone member, a power source for the first transmitter and a first actuator operable by a user for actuating the first transmitter to send a signal to the mobile phone member. The mobile phone member includes a mobile phone transceiver for establishing a first communication link between the mobile phone transceiver and the first transmitter; and the second communication link between the mobile phone transceiver and a remote receiver for transmitting and receiving at least one of data, voice and messages between the mobile phone transceiver and a remote receiver. A mounting member is provided for selectively removably mounting the mobile phone member to the wearable member, and permitting the mobile phone member to engage the first actuator to actuate an emergency signal.

20 Claims, 16 Drawing Sheets

U.S. PATENT DOCUMENTS

| | | | |
|---|---|---|---|
| 6,567,523 B1 | 5/2003 | Ghassabian | |
| 6,707,764 B2 | 3/2004 | Davidson et al. | |
| 6,757,389 B2 | 6/2004 | Firooz | |
| 6,757,390 B2 | 6/2004 | Ito et al. | |
| 6,775,206 B2 | 8/2004 | Karhu | |
| 6,807,564 B1 | 10/2004 | Zellner et al. | |
| 6,850,773 B1 | 2/2005 | Ghassabian | |
| 6,882,870 B2 | 4/2005 | Kivala et al. | |
| 6,917,797 B1 | 7/2005 | Hoppa | |
| 6,963,283 B1 | 11/2005 | Gonzalez | |
| 6,973,185 B2 | 12/2005 | Anlauff | |
| 6,978,160 B2 | 12/2005 | Hutchison et al. | |
| 6,990,047 B1 | 1/2006 | Barbagiovanni et al. | |
| 7,084,771 B2 | 8/2006 | Gonzalez | |
| 7,096,048 B2 | 8/2006 | Sanders et al. | |
| 7,200,416 B2 | 4/2007 | Aisenberg | |
| 543,192 A1 | 5/2007 | Jung | |
| 7,251,470 B2 | 7/2007 | Faucher et al. | |
| 7,280,844 B2 | 10/2007 | Ikeda et al. | |
| 7,312,709 B2 | 12/2007 | Kingston | |
| 7,348,882 B2 | 3/2008 | Adamczyk et al. | |
| 7,423,538 B2 | 9/2008 | Gonzalez | |
| 7,453,364 B2 | 11/2008 | Sarela et al. | |
| 7,486,194 B2 | 2/2009 | Stanners et al. | |
| 7,498,937 B2 | 3/2009 | Martin et al. | |
| 7,509,094 B2 | 3/2009 | Moran et al. | |
| 7,529,155 B2 | 5/2009 | Fasciano | |
| 7,640,042 B2 | 12/2009 | Hong | |
| 7,787,857 B2 * | 8/2010 | Peterman | 455/404.1 |
| 2001/0049294 A1 | 12/2001 | Olsen | |
| 2001/0055243 A1 | 12/2001 | Haywood | |
| 2003/0103413 A1 | 6/2003 | Jacobi, Jr. et al. | |
| 2004/0057578 A1 | 3/2004 | Brewer | |
| 2004/0063475 A1 | 4/2004 | Weng | |
| 2004/0121756 A1 | 6/2004 | Griffin et al. | |
| 2004/0224720 A1 | 11/2004 | Sun et al. | |
| 2005/0197112 A1 * | 9/2005 | Yang et al. | 455/418 |
| 2007/0008127 A1 | 1/2007 | Jakobsen | |
| 2007/0042821 A1 | 2/2007 | Lee et al. | |
| 2007/0082651 A1 | 4/2007 | Loizeaux | |
| 2007/0082652 A1 | 4/2007 | Hartigan et al. | |
| 2007/0182548 A1 | 8/2007 | Raad | |
| 2008/0132199 A1 | 6/2008 | Hirata | |
| 2008/0214142 A1 * | 9/2008 | Morin et al. | 455/404.2 |
| 2008/0267014 A1 | 10/2008 | Hyatt | |
| 2009/0069045 A1 | 3/2009 | Cheng | |
| 2009/0280861 A1 | 11/2009 | Khan | |
| 2009/0322513 A1 | 12/2009 | Hwang et al. | |
| 2012/0064855 A1 * | 3/2012 | Mendelson | 455/404.2 |

FOREIGN PATENT DOCUMENTS

| | | |
|---|---|---|
| GB | 2 439 362 | 12/2007 |
| JP | 08-009006 | 1/1996 |
| JP | 2002-074542 | 3/2002 |
| JP | 2002-125020 | 4/2002 |
| JP | 2003-244000 | 8/2003 |
| JP | 2004-320193 | 11/2004 |
| JP | 2006-234778 | 9/2006 |
| JP | 2007-213533 | 8/2007 |
| JP | 2008-015993 | 1/2008 |
| WO | WO 02/052360 | 7/2002 |

OTHER PUBLICATIONS

Emporia Telecom Product Data Sheet, Time Series Cellular Phone,—Feb. 2008.

Emporia Telecom Product Data Sheet, Life Series Cellular Phone,—Feb. 2008.

* cited by examiner

EMERGENCY ALERT DEVICE WITH MOBILE PHONE

I. TECHNICAL FIELD OF THE INVENTION

The present invention relates to an emergency alert device of the type that a user can employ to call for help in an emergency; and more particularly, an emergency alert device that incorporates a mobile telephone of the non-land line-type.

II. BACKGROUND OF THE INVENTION

Emergency alert devices have been used for quite some time to provide a measure of safety and security to persons, and especially persons who are likely to find themselves in a situation wherein they need help, but are unable to reach a telephone to call for help.

Emergency alert devices are especially popular with older people who, because of age or infirmities, are subject to falling or suffering strokes and heart attacks that can immobilize them. When immobilized, such infirm people often are not capable of ambulating to a nearby phone, to make a telephone call to a care giver, such as a friend, family member, or usually, a help desk operator who is trained to respond to the telephone call by contacting a friend or emergency responder.

Examples of such emergency devices are the "Life Alert" device manufactured by life Alert Emergency Response, Inc., and the American Medical device that is distributed by American Medical Alarms, Inc.

The Life Alert and American Medical devices operate by using two separately encased and remotely positioned components. The first component comprises a portable wearable device that contains an emergency button, and a radio transmitter. When the emergency button is activated by a user, a radio signal is sent to the second component that comprises a base unit. The base unit is usually placed at a fixed position in the dwelling, and is in communication with the land telephone line of the building in which the device is used. The portable wearable unit typically comprises a small pendant-sized unit that is coupled to a lanyard or rope, and worn like a pendant around the neck of the user. The base device is often the size of a multi-line telephone base set, and is placed at a position in the house close to a telephone jack, so that it may connect through the phone jack into the land line circuitry of the house.

To operate the unit, a user depresses a button on the pendant/portable unit. The pendant then sends a signal to the base unit. The base unit has an automatic dialing feature and communicates a signal through the land line of the house to a help desk maintained by a company, such as Life Alert or American Alarms, Inc. See www.lifealert.com and www.americanmedicalalarms.com.

The normal protocol for dealing with such a call is that the call is received by the help desk operator, who then tries to communicate verbally with the user. This verbal communication is usually attempted through a "speaker phone" feature of the base unit. As is well known in the art, a "speaker phone" includes a microphone and audio speaker that is designed to enable the user to send and receive verbal messages in a "hands free" manner, and that also permits communication to occur if the user is relatively remote (e.g. several feet) away from the speaker phone. As such, a speaker phone is distinguishable from a hand set which usually requires the user to hold the unit against his head, and ear.

If the remote care giver (here a help desk operator) can communicate with the user and establish that nothing is wrong with the user, or that a false signal has been sent, the care giver can terminate the telephone call knowing that the user is in no emergency. On the other hand, if the user is capable of verbally communicating with the help desk so that the care giver can determine the nature of the emergency, the help desk operator might be able to obtain enough information to contact the appropriate emergency responder, who may be a person such as the next of kin, a closely located friend, an ambulance, fireman or a police agency.

Unfortunately, in many cases the help desk operator is not capable of determining the nature of the emergency. One cause for this inability is that the user may be too injured to communicate, or may be injured in a manner, such as having a stroke, wherein the user's ability to communicate is significantly compromised.

Another source of an inability to communicate is related much more to equipment issues than the patient condition. In particular, the speaker phone through which communication occurs is usually placed at a single point within the dwelling. As such, if the user is far away from the speaker phone (which often occurs), the user is unable to communicate through the speaker phone with the help desk person.

Many emergency alert servicing companies establish a protocol for dealing with such situations wherein communication is not established. Often, the first step in the protocol is for the help desk person to call a designated "friend". The primary attributes that the friend must have are a willingness to help the user if help is necessary, and a close proximity to the user. Although the designated "friend" would normally be a relative, a relative would not necessarily be a good "friend" if the friend is not located close to the user.

For example, if the user resides in a house with a relative, but the relative is out of the house most of the day due to work, it might be more effective to designate a stay-at-home neighbor to be the designated friend, since such neighbor can usually get over to the user's dwelling within a few minutes, as opposed to the lived-with-relative, whose work place may be, for example, a half an hour away.

If the help desk person is able to contact the designated friend (or friends), the designated friend will then go over to the user's house to determine the user's condition. Once with the user, the designated friend may choose to call an emergency responder (e.g. ambulance) directly, or alternately, re-contact the help desk. One reason that the designated friend may contact the help desk operator is to tell the help desk that the user is in no danger. Another reason that the friend may contact the help desk operator is to inform the help desk that action has been taken to contact an emergency responder, to ensure that an emergency responder is not contacted twice, once by the friend and a second time by the help desk. If the help desk person is unable to contact any of the one or more designated friends, or if the designated friend is not in a position to go to the user quickly, the help desk person will next call an emergency responder.

Although the aforementioned device does perform its function in a workmanlike manner, room for improvement exists. One area in which room for improvement exists relates to the distance between the position of the user and the voice communication device (e.g. speaker phone) that permits the user to talk to a caregiver such as the help desk operator. One way to overcome this problem is to use a radio device that is capable not only of providing a signal to the base unit, but also contains a speaker phone or other verbal communication device. Although this scheme works well, it has the drawback of often requiring a significantly larger pendant-type unit that can add both cost and discomfort to the user of the device.

Another vehicle for bringing the "speaker phone" communication device closer to a user is to employ a mobile telephone pendant that is worn by the user, and takes the place of both the pendant and the base unit, since the mobile phone would presumably be capable of making calls directly out to a mobile network, such as the mobile network operated by service provider companies such as Sprint, Verizon, T1 Mobile, AT&T and other "wireless" providers.

Although the mobile phone would appear to be an ideal vehicle, it also has drawbacks. These drawbacks reside primarily in the battery power consumption rate attendant to most mobile phones. Although great advances have been made in reducing the power consumed by mobile telephones, and also in prolonging battery life, at present, the power consumption rate of mobile phones limits their time between charges to normally one or two days. A large amount of battery power occurs because the telephone communications unit within the phone is required to send a periodic signal to the cell phone communications system, so that the cell phone communications system (network) will know the location of the phone, so that it can appropriately direct telephone calls from the network to the particular mobile phone.

Normally, charging a mobile phone requires that the phone be coupled by a cord or plug to a power source, such as a wall outlet, or a computer USB port. As the cord serves as a fixed length tether, the user is usually forced to remove or disengage the mobile phone from his person during such times as the phone is being charged. As this charging often takes a period of a few hours, it is likely that the user of the device and the mobile phone will become spatially separated at one or more points during the charging of the phone. If such spatial separation occurs, and the user has an emergency, he will not be close to the mobile phone when needed, and thus will not be able to make the emergency call for which the mobile phone is designed.

One object of the present invention is to provide a wearable emergency alert device that includes a mechanism to enable the user to make an emergency call, even at such times as when the mobile phone is spatially separated from the user, such as when the mobile phone is being charged.

IV. SUMMARY OF THE INVENTION

In accordance with the present invention, a wearable emergency alert device comprises a wearable member and a separately encased mobile phone member that is selectively attachable to the wearable member. The wearable member includes an attachment member for attaching the wearable member to a body part of the user, and a first transmitter. The first transmitter can send a first signal to a mobile phone member. A power source is provided for the first transmitter, and a first actuator is provided on the wearable member that is operable by a user for actuating the first transmitter to send a signal to the mobile phone member. The mobile phone member includes a mobile phone transceiver for establishing a first communication link between the mobile phone transceiver and the first transmitter, and a second communication link. The second communication link exists between the mobile phone transceiver and a remote receiver, for transmitting and receiving at least one of the data, voice, and message between the mobile phone transceiver and the remote receiver.

A mounting member is provided for selectively removably mounting the mobile phone member to the wearable member. The mounting member permits the mobile phone member to move between a first position wherein the mobile phone member does not engage the first actuator of the wearable member, and a second position wherein the mobile phone member engages the first actuator to cause the first actuator to activate the first transmitter to transmit a first signal to the mobile phone transceiver over the first communication link.

Preferably, the attachment member comprises a wrist band and the wearable member includes an outwardly facing surface wherein the actuator comprises a depressible switch facing outwardly from the outwardly facing surface. The mobile member includes an inwardly facing surface, and is depressible so that the inwardly facing surface can engage the actuator to thereby cause the mobile phone to depress the actuator of the wearable member.

The mobile phone member includes a first surface and a second surface, with the second surface including at least one control member for controlling operation of the mobile phone. This control member preferably includes an emergency alert member for causing the mobile phone to begin an emergency alert notification procedure. The mobile phone can include a display member that is capable of displaying a time function and may also include a touch screen that enables the user to enter information into, and view information on the mobile phone member as one would with other mobile phones.

In a most preferred embodiment, the wearable emergency alert device includes a GPS functionality wherein during an emergency alert signaling procedure, the GPS device is used to provide location data to the care giver.

In a most preferred embodiment, the wearable emergency alert device is capable of sending an emergency signal to a care provider in each of a first, second and third signaling protocol. In the first signaling protocol, the mobile phone member is mounted to the wearable member by the mounting member, so that the mobile phone member, when moved from the first position to the second position, engages the first actuator of the wearable member. This engagement of the mobile phone with the first actuator causes the first transmitter to transmit the first signal to the mobile phone transceiver. The first signal activates the mobile phone transceiver to transmit a mobile phone signal to a caregiver, such as a friend or a help desk.

The second signaling protocol preferably includes the mobile phone member including a control member for controlling operation of the mobile phone and a speaker phone, wherein actuation of the control member (that may comprise an emergency button), begins the second emergency alert protocol procedure that includes the mobile phone automatically placing a call to a remote caregiver, and actuating the speaker phone for permitting voice communication between a user and a caregiver.

The third signaling protocol preferably includes the mobile phone being detached from, and remotely positioned from the wearable member. The third emergency signaling protocol is commenced by actuating the first actuator on the wearable member, to cause the first transmitter to send a radio signal to the remote mobile phone transceiver. The reception of the radio signal by the mobile phone transceiver causes the mobile phone transceiver to automatically commence a mobile telephone call between the mobile phone transceiver and a caregiver.

One feature of the present invention is that several different signaling protocols exist. This feature has the advantage of providing a variety of ways to get an emergency signal to a care giver that can render appropriate aid to a user in need. The plurality of signaling protocols enables such a signal to be send and received, even during times when the mobile phone is in being charged, and spatially separated from the user. Additionally, this protocol also provides an enhanced signaling ability when the mobile phone is coupled to the wearable member, and therefore very close to the user.

Another feature of the present invention is that the wearable member uses a radio signal, and is capable of being moved between an on and off position. The radio signal of the wearable member is such that it is normally in an "off position" and thereby does not use any electrical power for most of its existence. Rather, electrical power is only used by the radio transmitter of the wearable member when it is desired that a signal be sent. Because of this mode of operation, the battery of the wearable member will often last for a period of months or years between the need to either change the battery or recharge it. This differs significantly from a mobile telephone that often requires recharging or battery replacement every few days.

These and other features and advantages of the present invention will become apparent to those skilled in the art upon a review of the drawings and detailed description presented below, that represent the best mode of practicing the invention perceived presently by the Applicant.

VI. BRIEF DESCRIPTION OF DRAWINGS

Figure 15:
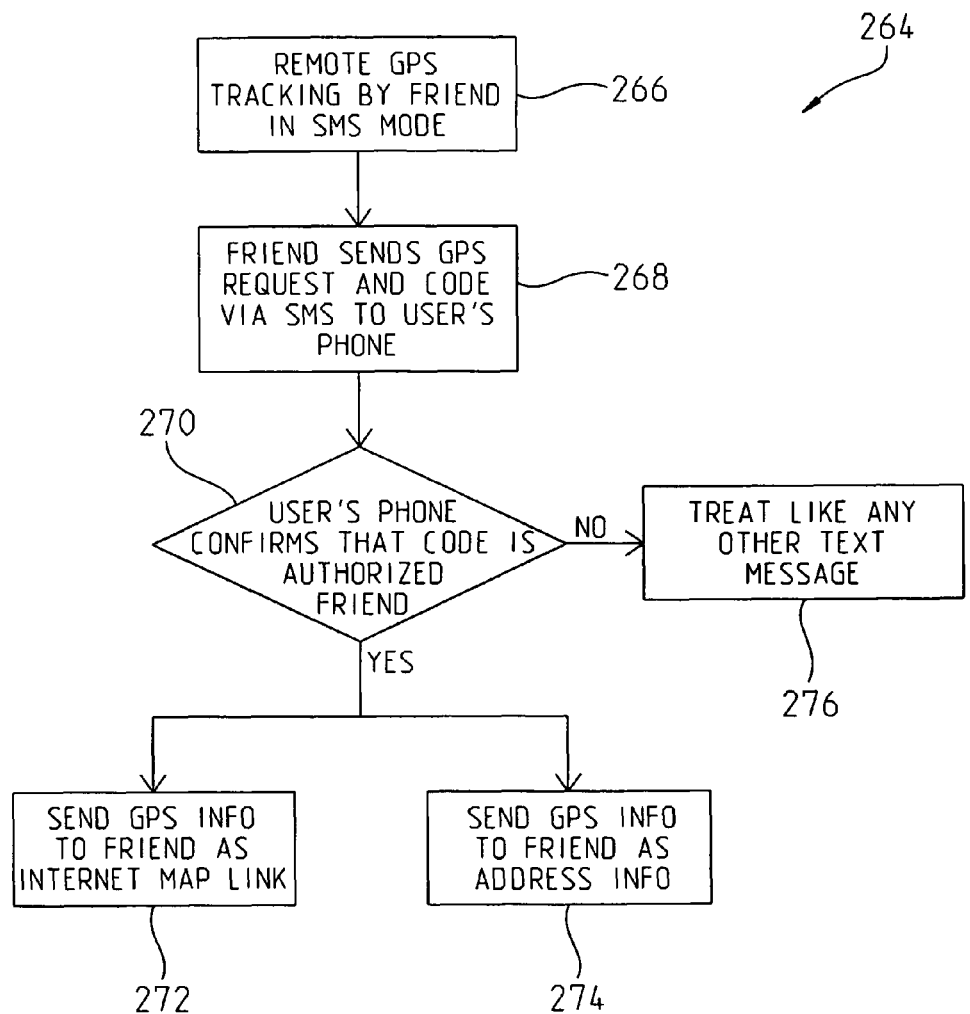
Figure 16:
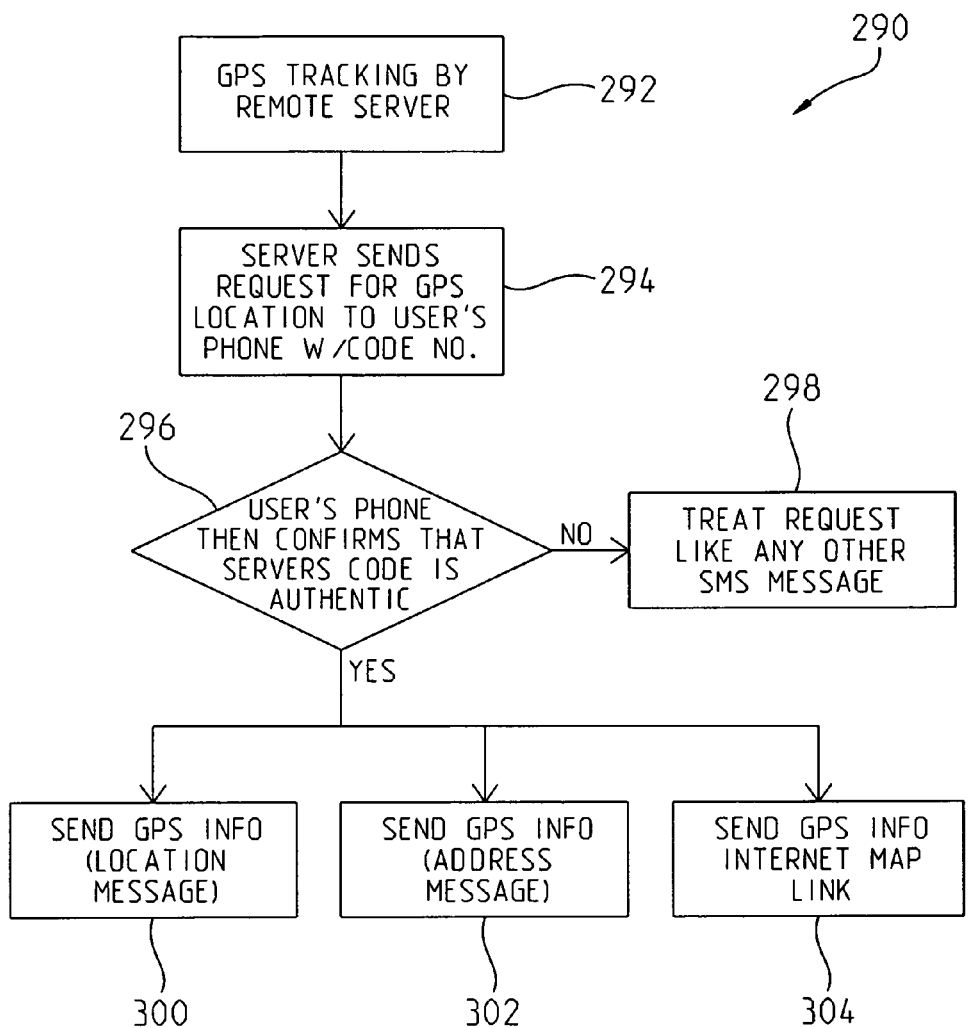
Figures 17, 18:
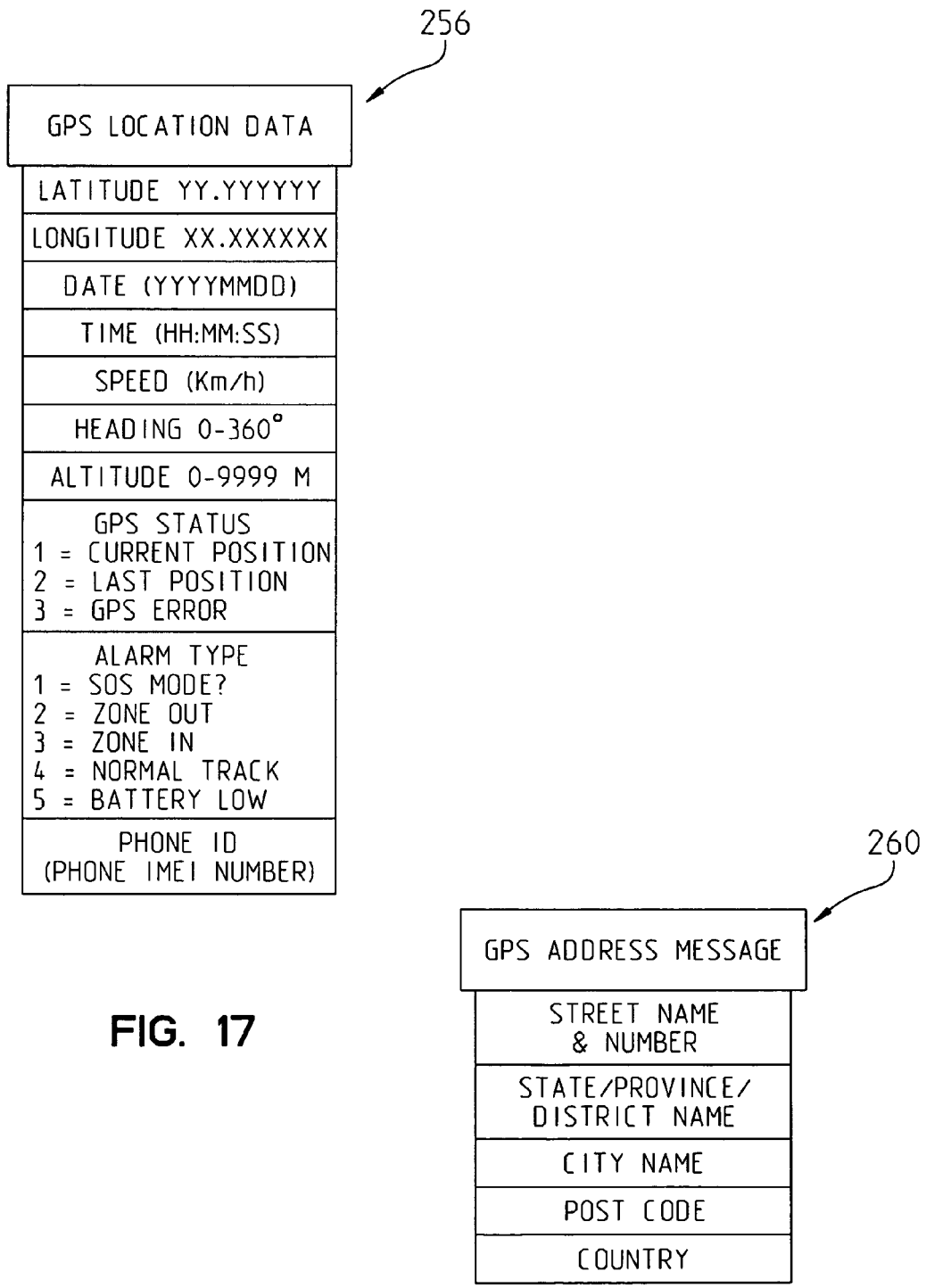

FIG. 15 relates to another method by which a third party can request location information from the user employing the emergency alert device of the present invention;

FIG. 16 relates to a method used for a remote server to obtain location information from a user;

FIG. 17 is a schematic view of the information of the type that can be transmitted from the GPS device to a third party; and FIG. 18 is a schematic representation of the GPS address message information that is provided by the GPS system of the emergency alert device of the present invention.

VII. DETAILED DESCRIPTION OF PREFERRED EMBODIMENTS

Figure 5A:
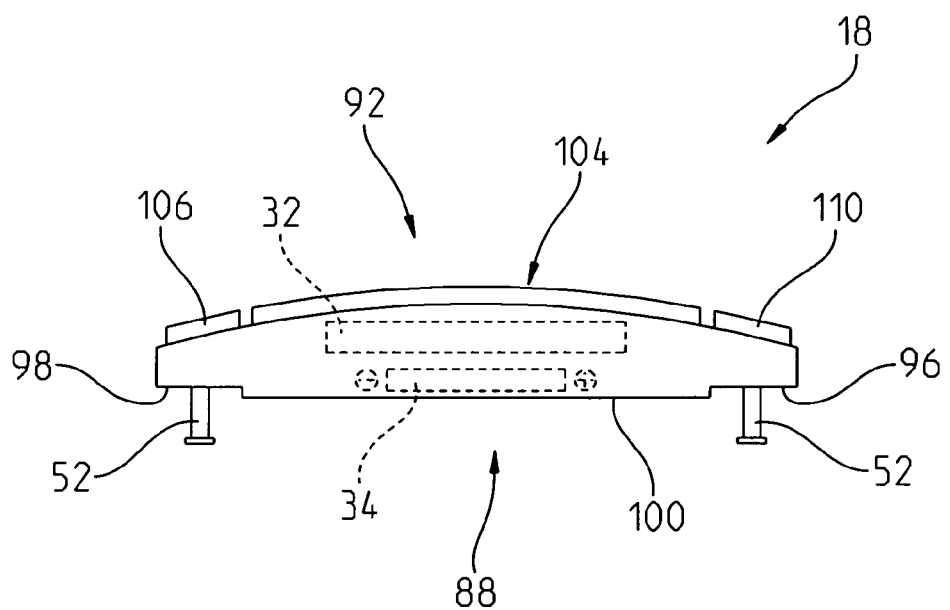
FIG. 5A is a side view of the cell phone member 18 of the present invention.
Figure 5:
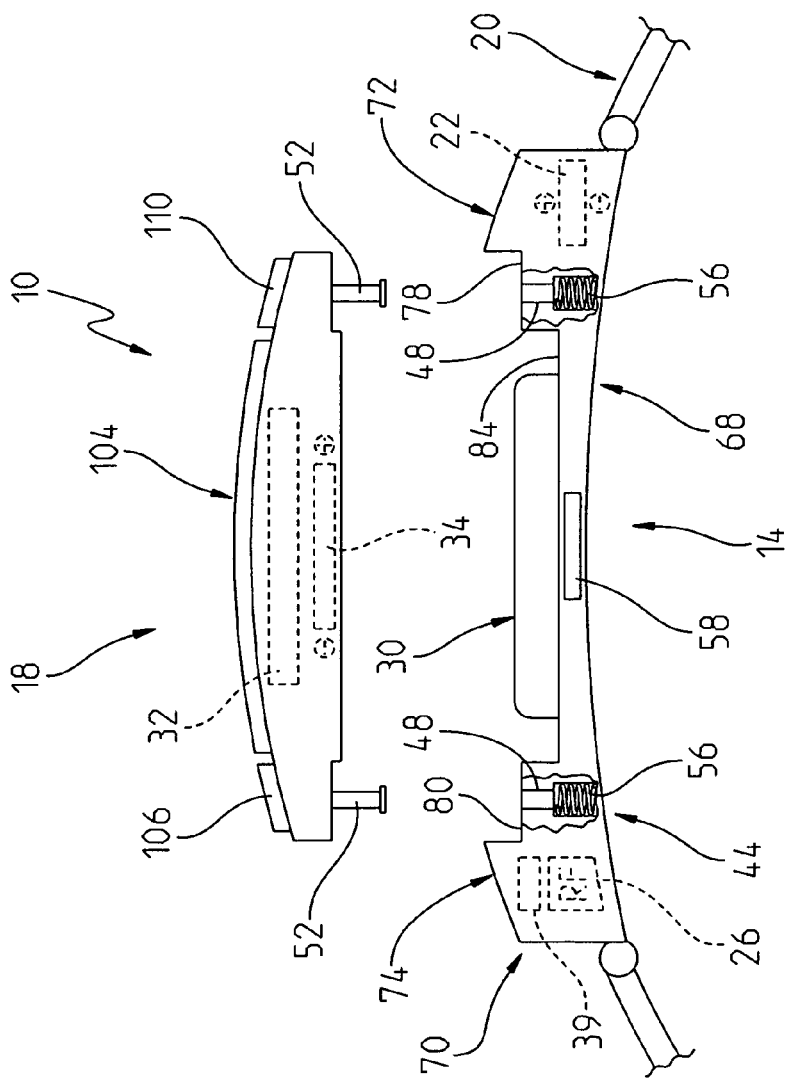
FIG. 5 is a side view, partly broken away, of the emergency alert device of the present invention, showing the mobile phone member disengaged from the wearable member.
Figure 7:
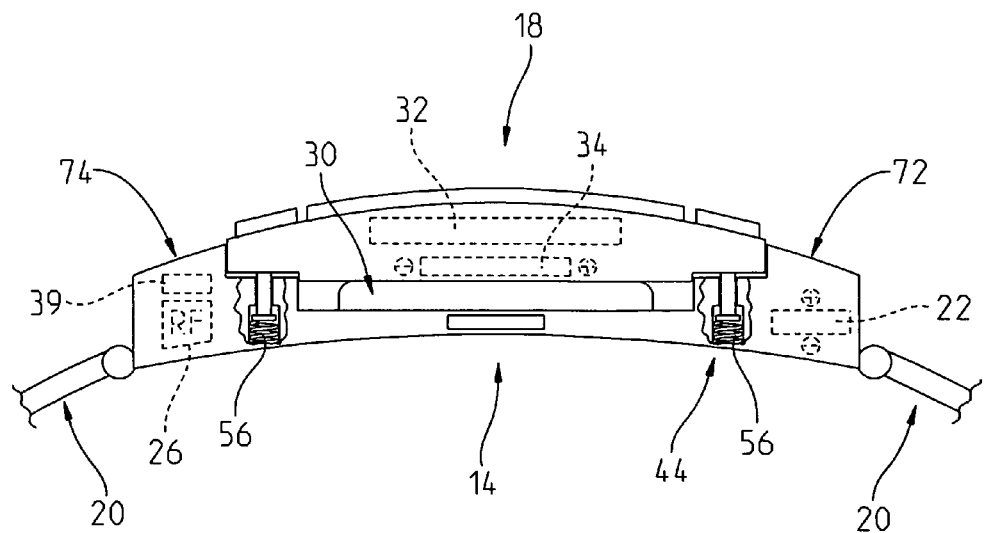
FIG. 7 is a side view of the mobile phone member mounted to the wearable member similar to FIG. 6, except shown wherein the mobile phone is depressing the first actuator of the wearable member.
Figure 8:
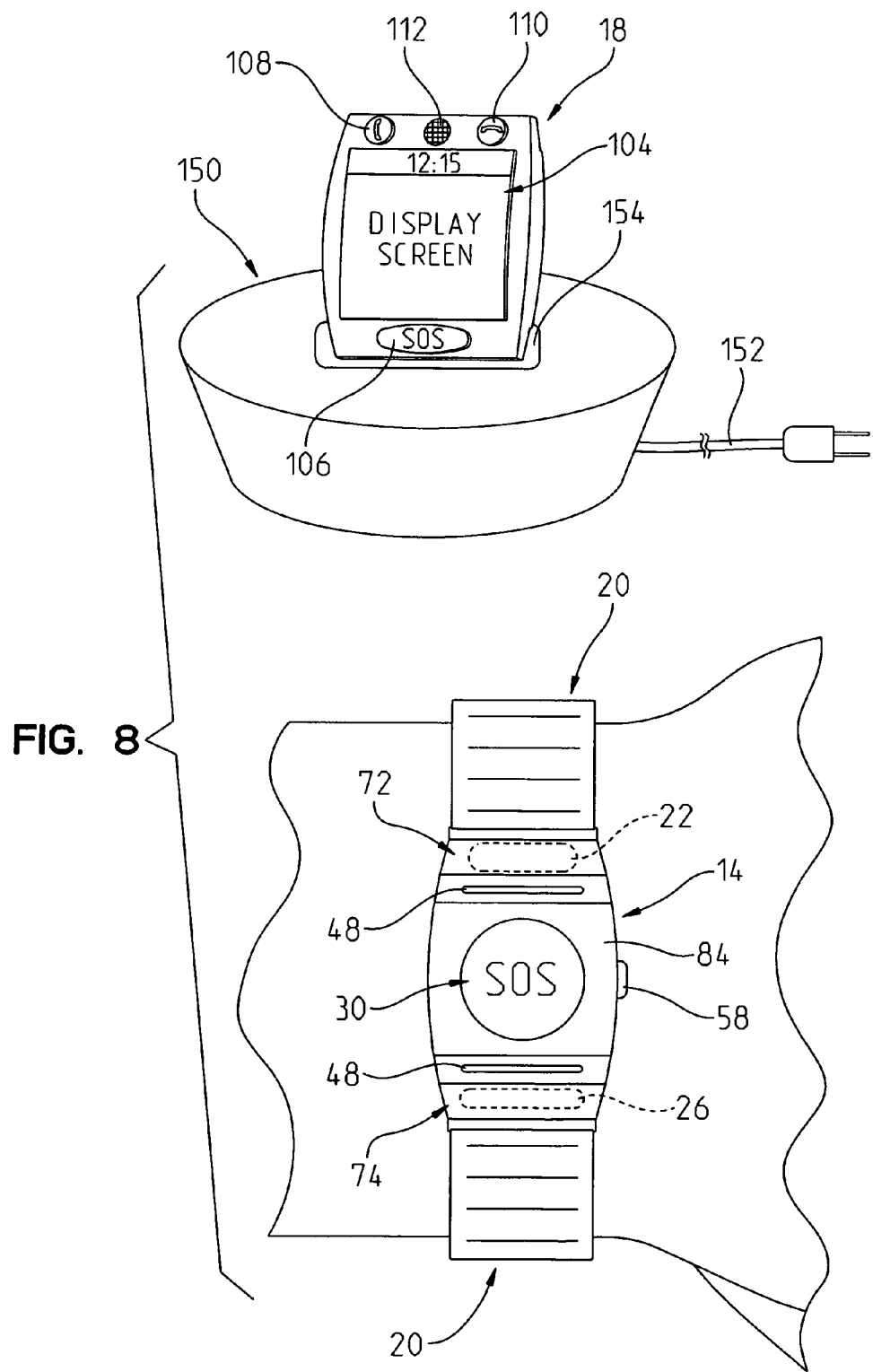
FIG. 8 is an exploded view showing the wearable member on the wrist of the user, and the mobile phone member placed in a charger cradle.

A wearable emergency alert device 10 that is wearable by a user U is shown in the drawings. The wearable emergency alert device 10 includes a wearable member 14, and a mobile phone member 18. The mobile phone 18 is selectively attachable to the wearable member 14. As such, it can be both engaged with the wearable member as is shown, for example in FIGS. 6 and 7; and the mobile phone member 18 can be detached from the wearable member 14 as shown in FIGS. 5, 5A and 8.

The wearable member 14 includes an attachment member 20 for attaching the wearable member 14 to a user's body part. In the embodiment shown in the drawing, the attachment member 20 comprises a band similar to the watchband that one might find on a wrist watch. The emergency alert device 10 shown in the drawings is designed to have an appearance and size of a wrist watch so that, like a wrist watch, it will fit on the wrist of a user U. As will be described in more detail below, the emergency alert device 10 not only includes its emergency alert device functionality, but also includes a wrist watch like functionality, as it has a display that can display the time; along with mobile phone functionality by virtue of the presence of the mobile phone 18.

The wearable member 14 includes a first transmitter 26 that comprises a radio frequency transmitter, similar to the radio wave-like transmitter that one might find in a highly miniaturized walkie-talkie 26. A power source such as battery 22 is provided for providing electrical power to the radio frequency transmitter 26. The radio frequency transmitter 26 is capable of transmitting a radio signal over a relatively short distance (a few tens of yards to a few hundred yards). As will be appreciated, the miniaturization of the radio transmitter 26 necessary to enable the radio transmitter 26 to fit within a watch-like configuration, along with the miniaturization required of the power source battery 22 likely limits the transmitting power that can be achieved by the radio frequency transmitter 26, and thus, effectively limits the range of the transmitter 26.

The frequency range that is preferably used by the radio frequency transmitter 26 is in the 755 or 900 GHz band that is similar to the band on which one might use in a portable handset of a land line phone. The transmitter 26 is normally in an "off" position, so that it does not draw any power from the battery 22. By being in the off position, the radio frequency transmitter 26 seeks to extend the useful life of the battery 22 for the longest period possible. Under appropriate circumstances, the battery 22 for the radio frequency transmitter 26, will maintain a sufficient charge to power the radio frequency transmitter 26 over a period of months to years.

Figure 6:
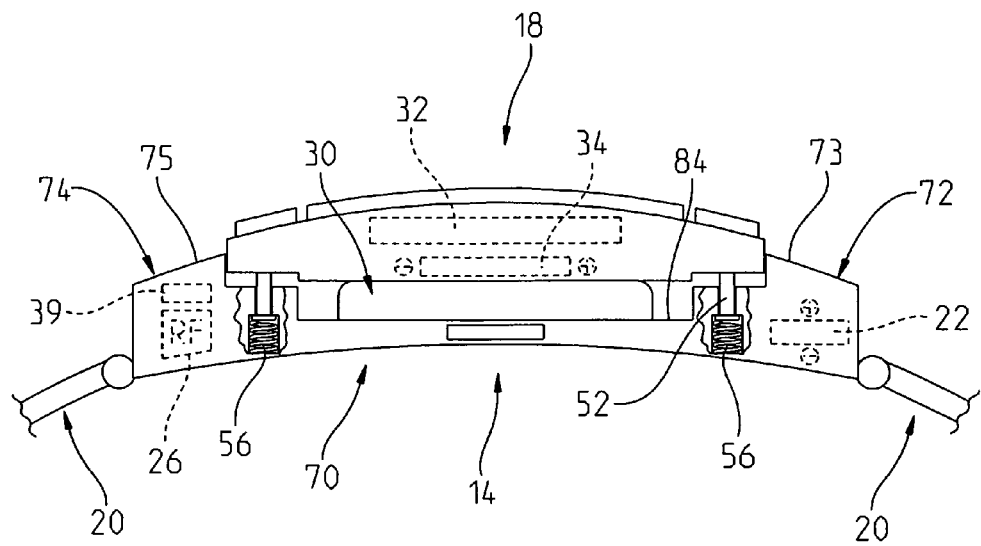
FIG. 6 is a side view of the mobile phone member mounted to the wearable member of the present invention, wherein the mobile phone is shown in the disengaged position where it is not depressing the first actuator.

The radio frequency transmitter 26 is actuated through the actuation of a first actuator 30 that is operable by a user U for actuating the first radio frequency transmitter 26 to send the signal to the mobile phone member 18. As will be described in more detail with regard to FIGS. 6 and 7, the first actuator 30, comprises a depressible SOS button, that is spring-loaded to normally be in the un-depressed position, such as is shown in FIG. 6. However, when depressed, such as is shown in FIG. 7, the button 30 actuates a switch to activate the radio frequency transmitter 26 to an "on" position for transmitting a pre-loaded signal to the mobile phone 18. Preferably, the signal transmitted by the radio frequency transmitter is a command signal that commands the mobile phone 18 to commence a signaling protocol to a care giver, as will be described in more detail later. However, the signal sent by the radio frequency transmitter can be one of a voice signal, data signal or SMS (short message signal) to the mobile phone 18, such as a signal emulating a text message.

The wearable member 14 may also include an accelerometer 39 that is provided to help determine if the user has a fall. In the case that a user has a fall, the accelerometer can sense the existence of a fall and through its coupling to a radio frequency transmitter 26 can provide a signal to a help desk. In a manner similar to a manner in which the radio frequency transmitter 26 provides a signal to the mobile phone 18, the accelerometer can provide a similar signal to the phone 18, contact the help desk with a pre-recorded message that the user has fallen, or else, to open a radio link between the radio frequency transmitter 26 and the mobile phone 18, and, through a mobile phone type connection to the help desk.

In a preferred embodiment, an accelerometer such as a MEMS motion sensor 3 axis, smart digital output "piccolo" accelerometer can be employed. An example of such an accelerometer is one that is manufactured by ST Micro Electronics, and is sold as Model No. LIS302DL.

This particular accelerometer is described as being an ultra-compact low-power 3 axes linear accelerometer that includes a sensing element and an interface. The accelerometer is able to provide the measured acceleration through the external world through I$^2$C/SPI serial interface. The sensing element is capable of detecting the acceleration, and is manufactured using a dedicated process developed by ST to produce inertial sensors and actuators and silicon. The IC interface is manufactured using a CMOS process that allows one to design a dedicated circuit that is trimmed to better match the sensing element characteristics. The LIS302DL model is stated to have dynamically user selectable full scales of + or −2G/+ or −8G, and is capable of measuring accelerations with an output battery of 100 Hz or 400 Hz. A self-test capability allows the user to check the functioning of the sensor of the final application.

The device may be configured to generate inertial wake up-free fall interrupt signals when a programmable acceleration threshold is crossed at least in one of the three axes. Thresholds and timing of interrupt generators are programmable by the end user on the fly. The device is also capable of operating over a wide range of temperatures from approximately −40 degrees C. to about +85 degrees C. Other information about these sensors can be obtained from the product brochure that is included within the Information Disclosure Statement for the instant application, and that is fully incorporated herein by reference.

The mobile phone 18 comprises a wireless phone that may include a plurality of circuits that are capable of performing a plurality of functions. However, one of the most important functionalities of the mobile phone for purposes of this invention is the transceiver function. The transceiver comprises the circuitry and associated parts (e.g. antenna, power source 34, etc.), that gives the mobile phone 18 its capability for receiving and transmitting messages. In the particular mobile phone 18 of the present invention, the transceiver 32 has the capability of receiving a radio frequency message from the first radio frequency transmitter 26, along with the processing capabilities for appropriately processing the signal so received. Additionally, the mobile phone 18 may have the capability of transmitting an appropriate signal back to the radio frequency transmitter 26 if the radio frequency transmitter is designed to also include a receiver function.

Further, the transceiver 32 of the mobile phone 18 has the capability to receive and transmit messages between the mobile phone, and a wireless phone network, such as the networks operated by mobile phone service providers such as Verizon, AT&T, Nextel, Sprint, T-Mobile, US Cellular, Boost, Cricket, Vodafone, Telefonica, Moviles, Orange, TIM, UK.Telecom.mobile, Telecom Italia, and others.

The mobile phone 18 also includes a battery power source 34. The battery 34 that is used for the mobile phone is a rechargeable battery, of the type normally used for mobile telephones. Often the choice factors for determining the particular battery chosen include a consideration of the storage capacity of the battery, its voltage output, and its configuration. Configuration is often an important factor as the battery must fit within the space allotted within the casing of the mobile phone.

Figure 9:
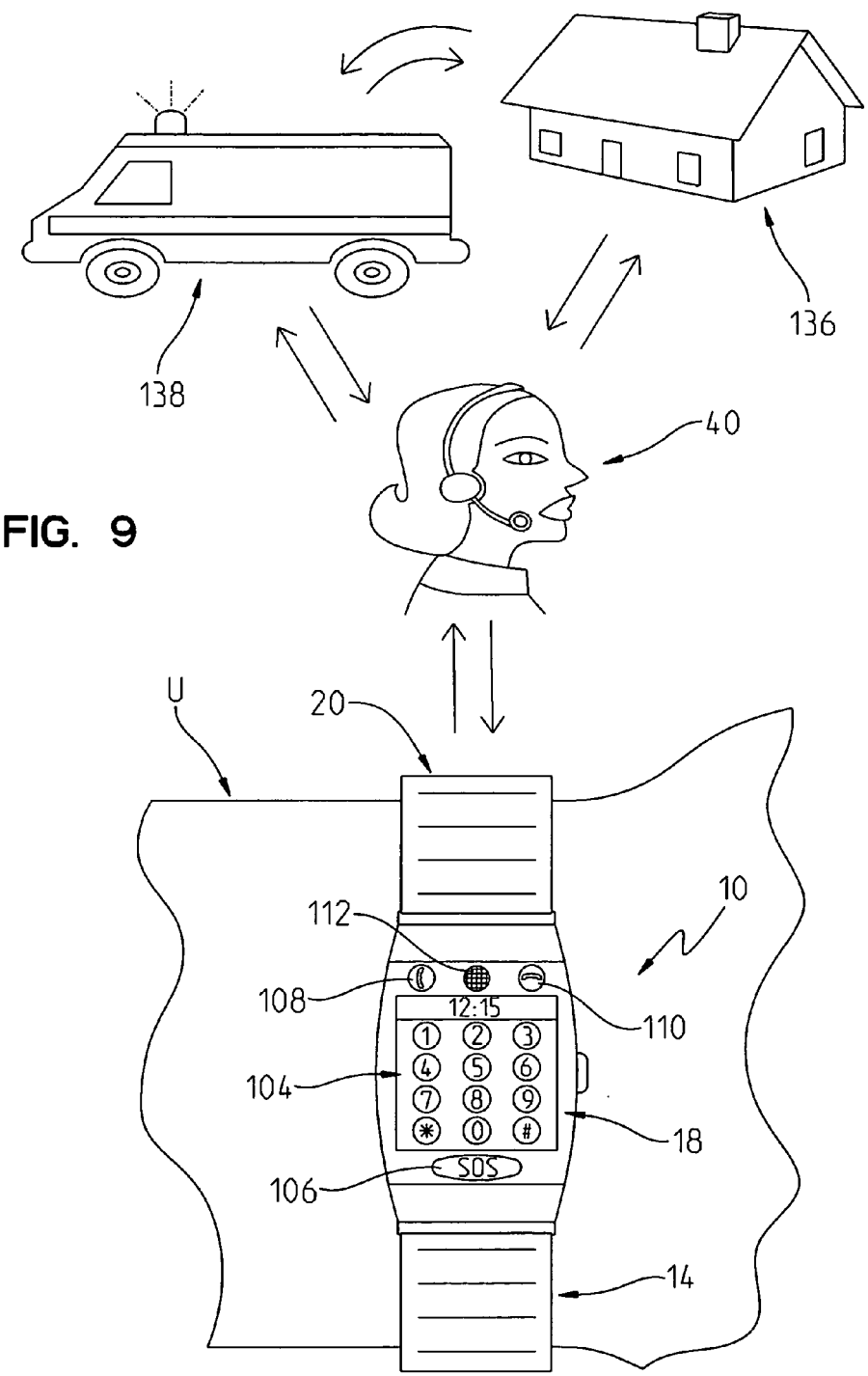
FIG. 9 is a schematic view showing communication paths between the user and a care giver such as a help desk member, when the device is being used in its first or second signaling mode.

The mobile phone 18 is designed to be able to communicate through a wireless phone network with an external remote phone, such as remote phone 40 that is operated by a care giver, which in FIGS. 8 and 9 is shown as a help desk operator.

A mounting member 44 (FIG. 4) is provided for selectively removably mounting the mobile phone member 18 to the wearable member 14, and permitting the mobile phone member 18 to move between a first position, as shown in FIG. 6 and a second position FIG. 7. In the first position (FIG. 6), the mobile phone member 18 does not engage the first actuator 30 of the wearable member 20. In the second position (FIG. 7), the mobile phone member 18 engages the first actuator 30, to cause the first actuator 30 to be depressed, to thereby actuate the first transmitter 26 to transmit a first signal to the mobile phone transceiver 32. As is shown in FIGS. 4-7, the mounting member 44 pair of latch-containing slots 48 that are formed in the upper surface of the wearable member 14. These slots 48 are sized and positioned to receive mounting legs 52 that are formed on and extend downwardly from the underside surface of the mobile phone member 18.

The mounting legs 52 and slots 48 include a complimentary latch mechanism that enables the legs 52 to be locked into position in the slots 48. A release button 58 is provided for moving the latching mechanism of the wearable member 14, to enable the legs 52 and hence the mobile phone 18 to be disengaged from the wearable member 14 selectively by the user.

Springs 56 are provided on the wearable member 20. The springs are configured to normally bias the mobile phone's mounting legs 52 and hence, the mobile phone 18, in the first position, as shown in FIG. 6 wherein the mobile phone 18 does not engage the first actuator 30. However, the springs 56 allow the mounting legs 52 to move vertically, to thereby enable the mobile phone to move vertically downwardly, to engage the upper surface of the first actuator 30, and, upon further movement, to depress the first actuator 30 into its depressed position as shown in FIG. 7. As recited earlier, this depression of the actuator 30 causes an "on-off switch" (not shown) that is electrically coupled between the actuator 30 and the radio frequency transmitter 26 to turn on, to thereby permit the radio frequency transmitter to begin broadcasting the radio signal to the cellular phone transceiver 32.

Processor, memory and other electrical control circuitry are provided within the wearable member 14, so that the actuation of the radio frequency transmitter 26 by the first actuator 30 not only allows current to flow between the power source 22 and the radio frequency transmitter 26, but also actuates the circuitry and memory, so that an appropriate signal containing appropriate information is delivered to the radio frequency transmitter 26, so that an appropriate signal is forwarded to the mobile phone 18. Although this signal can be any of voice, data or messaging, it is likely that this signal will be a data signal that contains command information to command the actuation of the initiation of an emergency signal to be broadcast by the mobile phone member 18, in a manner wherein the transmitted signal is ultimately received by the care giver, such as the help desk operator 40 who is shown in FIGS. 8 and 9. Additionally, the accelerometer 39 can be incorporated in the mobile phone 18 instead of the wearable member 14.

The wearable member 14 includes an underside surface 68 that usually is placed against the skin of the wrist of the user, and an upper surface 70 that faces upwardly. The wearable member 20 includes a relatively thicker first end portion 72, and a relatively thicker second end portion 74. The relatively thicker first end portion 72 is provided for housing the battery, and the relatively thicker second end portion 74 is provided for housing the radio frequency transmitter 26 and the accelerometer 29.

The upper surfaces 73, 75 of the first and second portions can generally be designed to be at about the same height as the upper surface of the mobile phone member 18. Depending upon the particular desire of the designer and user, the upper surfaces 73, 75 can be designed to be at about the same height as the upper surface of the mobile phone 18 when the mobile phone device 18 is in its position where it is either not engaged to the first actuator 30 (as shown in FIG. 6), or alternately, wherein the mobile phone 18 is engaged with the actuator 30.

The upper surface 70 of the wearable portion 14 also includes a first and second shelf portions 78, 80, that are positioned generally inwardly of the end portions 72, 74, and is disposed between the first and second end portions 72, 74 and the central portion 84. The height of the first and second shelf portions 78, 80 is intermediate between the base of the central portion 84 and the upper surfaces 73, 75 of the first and second end portions 74. The upper surfaces of the first and second shelf portions 78, 80 include the latch-receiving slots 48 that are sized and positioned for receiving the latching legs 52 that extend downwardly have the underside surface of the cell phone 18.

The cell phone includes an underside surface 88 and an upper (or outwardly facing) surface 92. The underside surface 88 includes a first outboard portion 96, and a second outboard portion 98, and a central portion 100 disposed between the first and second outboard portions 96, 98. The cell phone is relatively thinner at the first and second outboard portions 96, and 98, and is relatively thicker at the central portion 100. The first and second outboard portions 96, 98 are sized and positioned to overlay the shelf portion 78, 80 of the wearable member 20. The central portion 100 is sized and positioned to overlay the central portion of the wearable member 20.

The underside surface 88 of the central portion 100 is generally planar, and is designed to engage the upper surface of the first actuator 30 of the wearable member 20. When the legs 52 that extend downwardly from the first and second outboard portions 96, 98 of the underside surface 88 of the mobile phone are disposed above slots 48, the mobile phone member 18 is positioned over the wearable member 20. When so positioned, depressing the mobile member 18, to move it into a direction toward the wearable member 20 will cause the underside surface 88 of the mobile phone 18 to engage and depress the first actuator 30.

Figure 1:
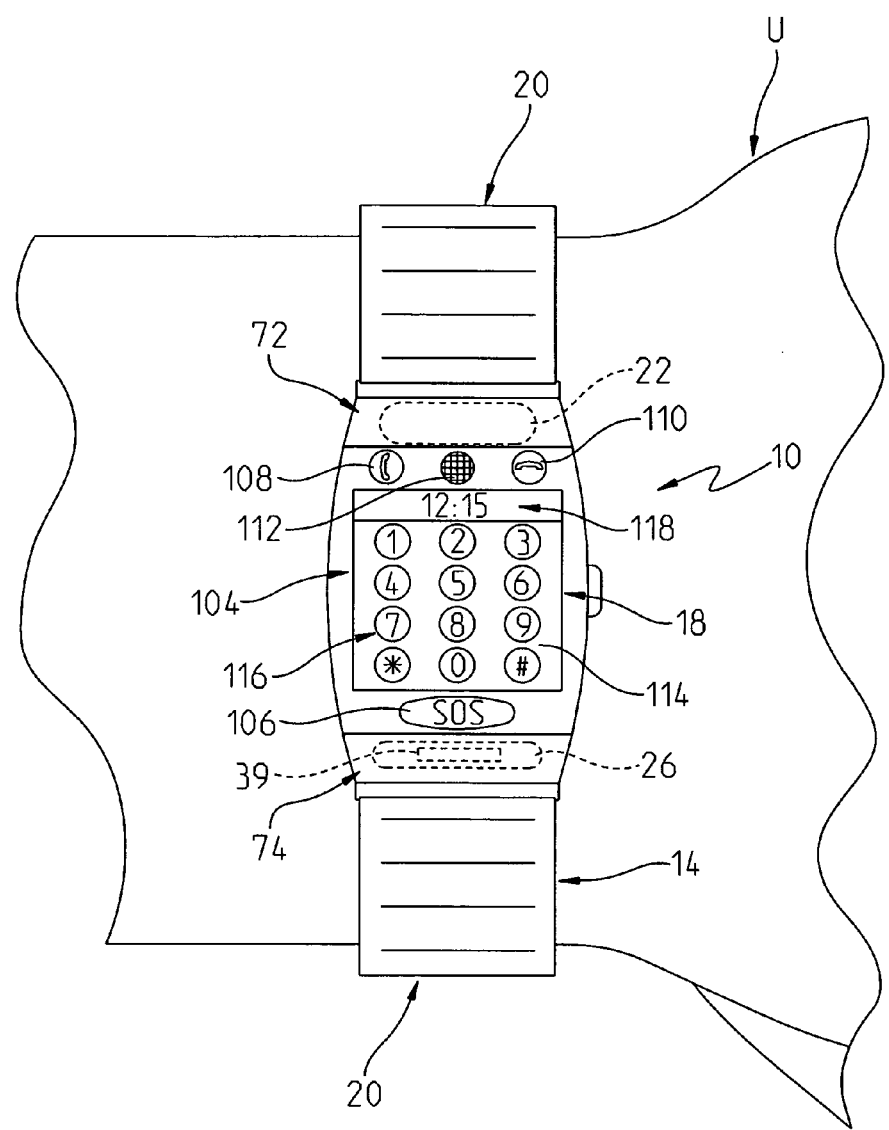
FIG. 1 is a front view of the wearable emergency alert device of the present invention, shown in a "wrist watch" configuration.

The upper side surface 92 of the mobile phone 18 is best shown at FIGS. 1, 5 and 5A as including an LCD screen display 104, along with a plurality of control buttons, including an emergency actuation (SOS) control button 106, a begin call or transmit call button 108, and an end call button 110. Additionally, a speaker phone device, comprising a combination microphone/speaker 112 is disposed between the begin call and the end call buttons 108, 110.

As is shown in FIG. 1, the display 104 preferably includes a touch screen display portion 114 that can include a dial pad functionality 116 including touch screen type keys that simulate a dial pad, so that one can use the cell phone 18 to make outbound phone calls. Similar to other touch screens used on mobile phones, the screen can interact with the processing capability of the mobile phone 18, to provide a wide variety of displays, including instructions, data, web pages, pictures, screen savers, maps and the like. Preferably, a time display portion 118 is also included on the display as such time display capabilities are helpful and appreciated in a device 10 that will likely preempt the use of a wrist watch because of its placement on the wrist of the user.

The begin 106 and end 108 call buttons function similarly to begin and end call buttons that are found on most cell phones. For example, one wishing to initiate a telephone call uses the touch pad or the touch screen dial pad display 116 to enter a number (e.g. 317-555-1212), and then presses the begin call button 108 when the number is so entered. This causes the mobile phone to then connect the phone call to the desired phone number. The end call button 110 is pushed at the end of the phone call.

Depression of the SOS button 106 begins an emergency alert actuation signaling protocol, that sends a signal to a care giver, such as an operator at a help desk 40, to thereby both send an alert to the care giver 40 that the user is experiencing an emergency, and to also transmit data and/or voice messages between the user and the help desk.

The actuation of the emergency call button 106 sends a signal to a pre-determined location, to thereby obviate the need for the user to input that information at the time of an emergency. In the case of a "false alarm", the user can depress the end call button 110 to call off the emergency alert.

Figure 2:
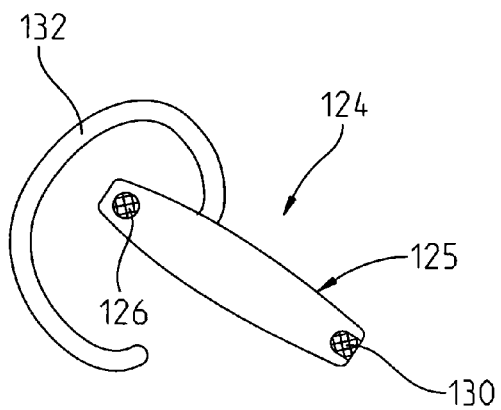
FIG. 2 is a side view of a blue tooth type telephone ear piece/speaker that can be used in connection with the emergency alert device of the present invention.
Figure 3:
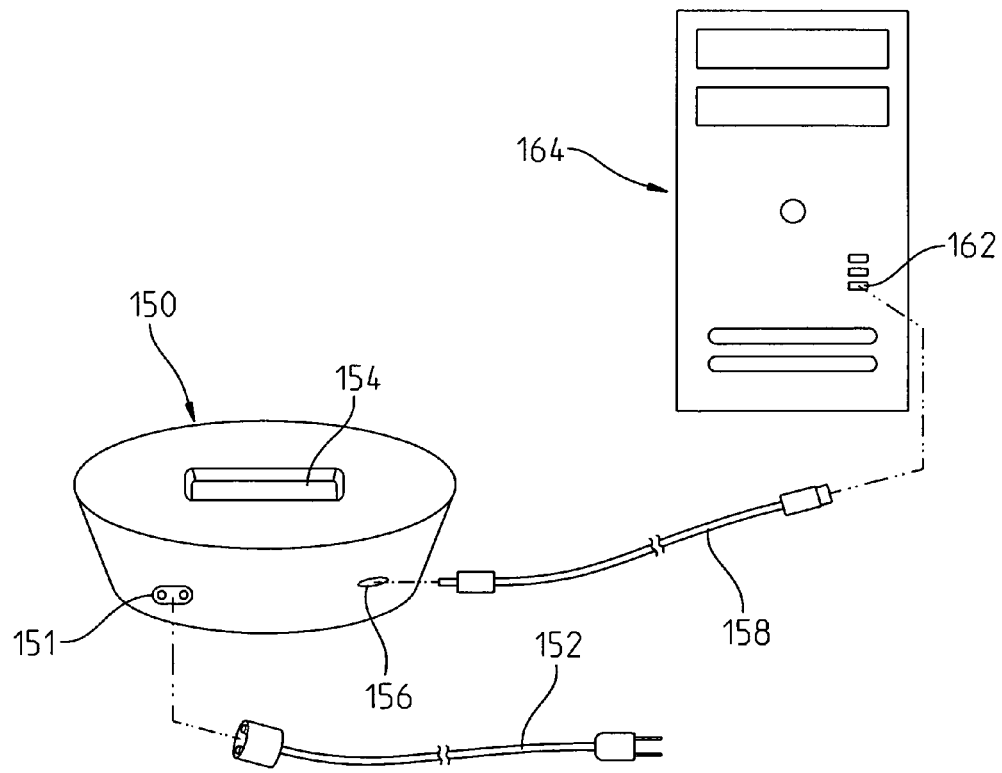
FIG. 3 is an exploded view of accessory components useable with the emergency alert device of the present invention, including a charging cable, synchronization cable, charger and computer.
Figure 4:
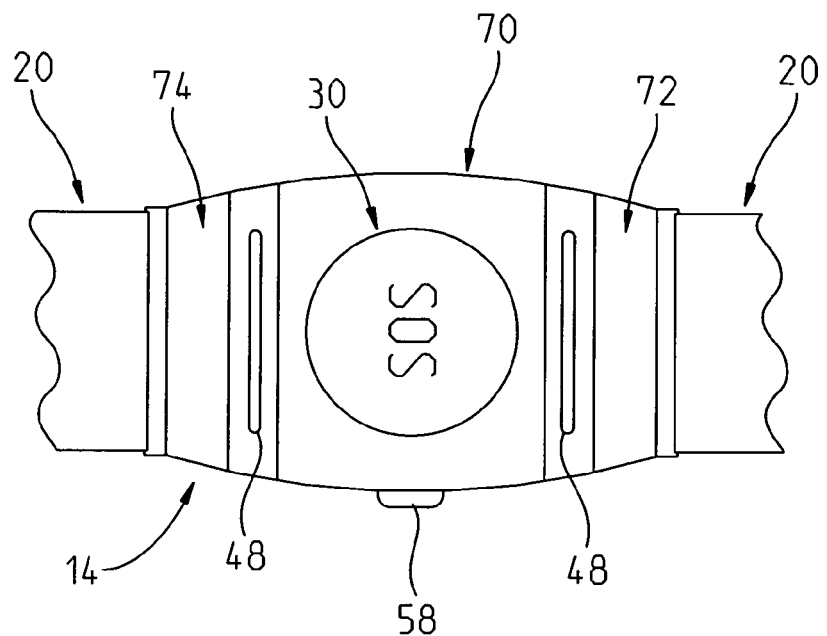
FIG. 4 is a top view of the wearable member of the emergency alert device of the present invention.

A plurality of accessories that are used in connection with the wearable emergency alert device 10 of the present invention are shown in FIGS. 2 and 3. Turning first to FIG. 2, a blue tooth-type headset or "hands-free" receiver 124 is shown. The receiver 124 includes a body portion 125, and an ear piece portion 132, for coupling the receiver 124 onto the ear of a user. A speaker 126 is positioned adjacent to the ear holder 132, and is positioned so that it can be placed adjacent to the ear canal of the user, so that the user can better hear sounds emanating from the speaker 126. A microphone 130 is provided that is separated from the speaker 126 by a sufficient distance so as to help reduce or avoid feedback, and that is placed closer to the mouth of the user when the blue tooth-type receiver ear member piece 124 is placed around the ear (not shown) of the user.

The blue tooth-type receiver device can be in communication with the cell phone 18. The blue tooth-type receiver device 124 can also be used when the emergency alert device, and in particular the mobile phone member 18 thereof is used in its normal telephone mode, wherein the user is employing the mobile phone 18 to have a voice conversation with some third party. Additionally, the blue tooth device 124 may be coupled to the mobile phone 18, so that in the event of an emergency alert, wherein the cell phone member 18 is not adjacent to the user, the blue tooth receiver 124 can be used to establish a voice communication between the patient and the care provider. For example, when the cell phone member 18 is being charged in its charging cradle 150 (FIG. 3), it is envisioned that the wearable wristband member 20 will be worn around the wrist of the user. If an emergency exists at such a time, the user will depress SOS button 30 on the wearable member 14 that will then send a signal from the wearable member 14 to the nearby mobile phone 18 in its cradle 150. As the user will likely not be close to the mobile phone 18 when it is being charged on the charging cradle 150, the mobile phone will establish a communication's link with the both the blue tooth receiver 124 and the care provider 40 (FIG. 9). Because of this two-channel communication, the user can establish a voice link with the care provider to better tell the care provider what sort of problem is being experienced by the user.

Another set of accessories are shown in FIG. 3. These accessories include charging and synchronization type accessories, and include a cradle charger 150 that can be placed on a table top or desk. The cradle charger 150 includes a power jack 151 for receiving a power cord 152 that contains a plug at one end, for being plugged into an AC type outlet. The power cord 152 includes a plug at its other end for coupling to cradle 150, so that the cord 152 can conduct current to the cradle charger 150. Charger 150 includes appropriate circuitry, to convert the AC current into a DC current at an appropriate voltage and amperage for charging the mobile phone member 18.

The charger 150 also includes a phone connector/receiving slot 154 that is formed on the top surface of the charger 150. This receiving slot/phone connector 154 comprises a member for holding the cell phone member 18 and a member for providing an electrical coupling between the cell phone member and the charger cradle. The cradle charger 150 also includes a USB jack 158 for receiving an end of a USB port 158, whose other end is coupled into a USB port 162 of a computer 164. Through this vehicle, the computer 164 can supply the cell phone not only with electricity to recharge its battery, but also data from the computer 164.

The ability to directly connect the phone 18 to a computer 164 is useful when trying to introduce new programs into the cell phone 18; to adjust the programming of the emergency alert sequence and protocol within the cell phone 18; and to otherwise synchronize data between the mobile phone 18 and the computer 164. For example, if the cell phone 18 is equipped with some sort of patient vital sign monitor (such as blood pressure), the vital sign monitor data stored on the cell phone 18 can be transferred into the computer 164 to provide a backup copy of the patient data, through the connection between the computer 164 and the cell phone 18 established by the cradle charger 150 and USB cord 158.

Figure 10:
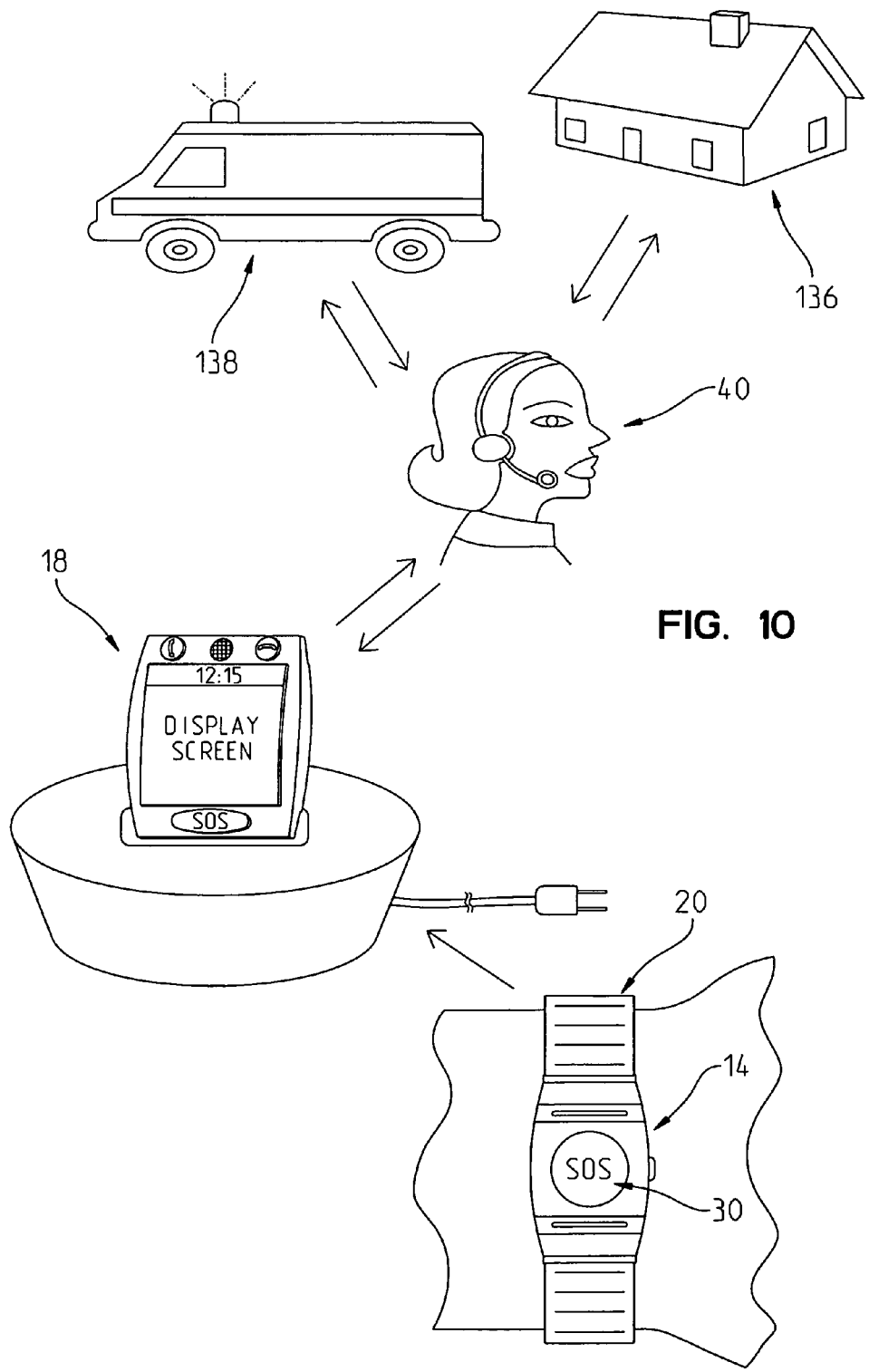
FIG. 10 is a schematic view of the communication scheme that exists between the user and a care giver, such as a help desk operator when the device is being used in its third protocol.

The reader's attention is now directed to FIGS. 9 and 10, wherein the operation of the device's first, second and third protocols will be discussed.

In a first protocol, the user presses downwardly on the mobile phone 18. The downward pressing of the mobile phone 18 moves it from its non-engaged position to its engaged position, wherein the underside surface of the mobile phone engages the emergency actuation actuator 30 (FIG. 10) on the wearable member 14. In FIG. 9, the actuator 30 is hidden from view, under the mobile phone 18, although in operation in the first protocol made, the device would appear as it does in FIG. 9, with the mobile phone 18 coupled to the wearable member 14.

The actuation of first actuator 30 causes the first transmitter 26 of the wearable member 14 to send a radio signal to the mobile phone 18. This emergency signal then begins the emergency protocol calling. Typically, this emergency calling results in a mobile phone 18 making a telephone call to a care provider 40. The care giver could be anyone from a help desk operator such as shown in FIG. 9, to a friend or relative (not shown). However, in most cases, it is likely that the first call would be made to a help desk operator 40, who is employed by a service whose job it is to monitor transmissions from the emergency alert devices of the service's users/subscribers.

When a call is made to the emergency care giver 40, she will initiate an attempt to converse with the user U, to determine the nature of the problem. As is appreciated, false alarms will often occur. By being able to converse with the user, the care giver 40 can not only determine whether the alarm is a real or false alarm, but can also determine the nature of the problem. To make this communication, the speaker phone 112 of the mobile device would be turned on, to permit voice communication. If the care giver cannot establish a verbal communication link to determine what is happening, or otherwise has determined that the emergency is real, the care provider may then make an appropriate telephone call to either a friend 136 or an emergency responder 138, such as an ambulance service, fire service or police service.

In many alarm protocols, the first call is made to a designated friend 136 who is often a person that is usually in close proximity to the user. In order to save the cost and expenses associated with a response by an emergency responder 138, most companies designate a friend 136 to first check on the user. If the care giver 40 is able to contact the friend 136, and the friend 136 is in close proximity, the friend 136 will then usually go to the user's location (often, home) to assess the user's condition. Alternately, if the care giver 40 cannot reach the friend 136; or determines that the friend is too far away to render immediate assistance; or otherwise determine that a very real emergency exists that needs to be responded to by an emergency responder immediately, the care giver 40 may then decide to call the emergency responder.

Alternately, the emergency responder can be alerted by the friend 136, who upon going over to check on the condition of the user, makes a determination that the user does need the services of an emergency responder. Because of the mobile phone 18 capability of the device, the friend 136 can employ the mobile phone 18 that is a part of the device 10 to contact the emergency responder, if no other phone is available or useable.

The second protocol operates generally similarly to the first protocol. However, the primary difference is that the sequence is commenced by the user pressing the SOS or emergency actuation button 106 on the mobile phone member 18. By pressing the SOS button 106 directly, the wearable member 14 and its radio transmitter 26 are bypassed, and not used. The mobile phone 18 then begins the emergency call to the emergency care giver 40. Once made, the second protocol operates generally similarly to the first protocol, as discussed above, including the speaker phone 112 being turned on to facilitate communication.

Figure 12:
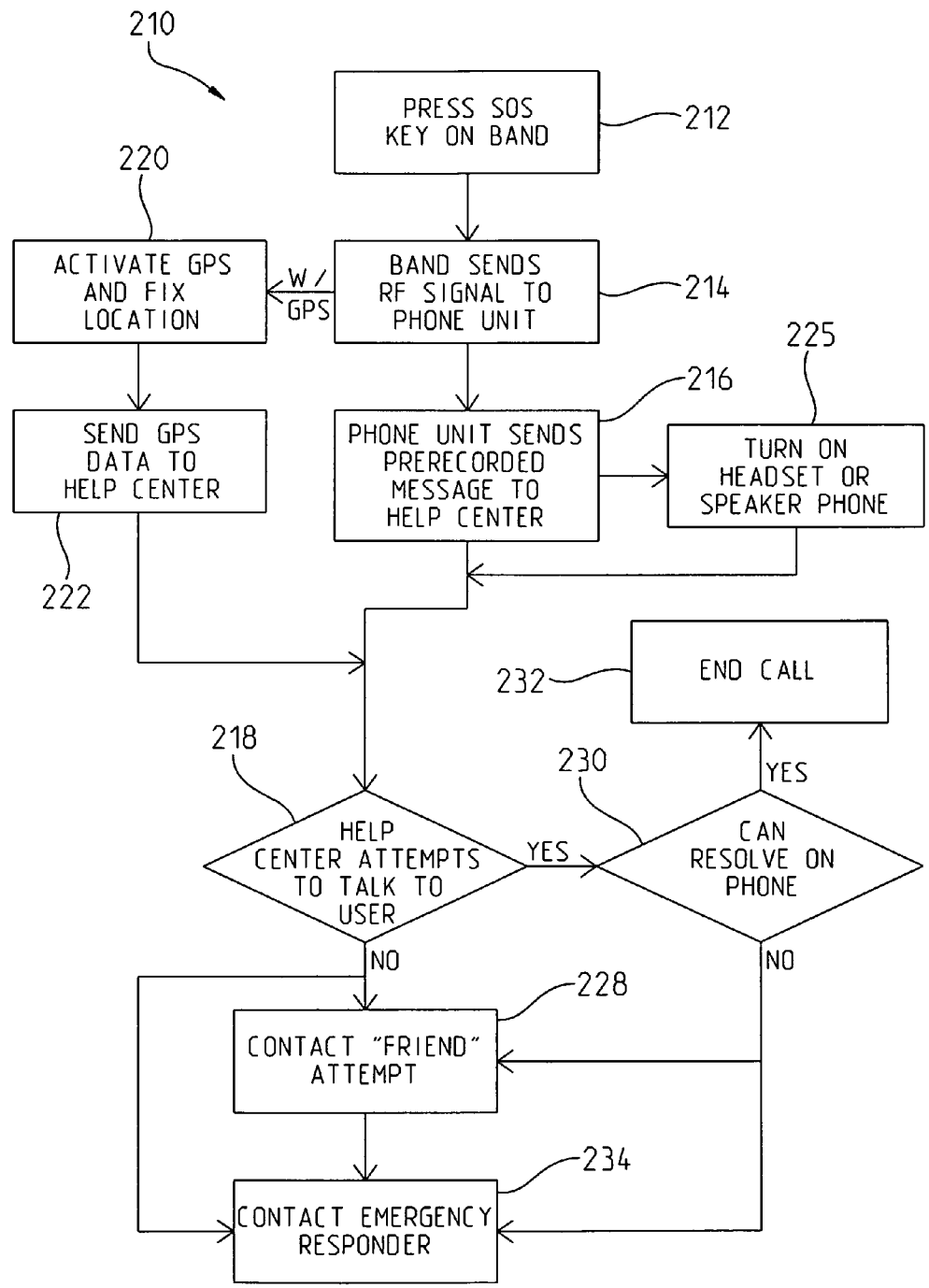
FIG. 12 is a schematic view of the procedure employed by the emergency alert device of the present invention to contact a care giver, when the emergency alert device is actuated by the first actuator on the wearable member being actuated.

The third protocol is best described with regard to FIG. 12. In the third protocol, it is assumed that the wearable member 14 is detached from and spatially separated from the mobile phone member 18. Because of the nature of the radio frequency transmitter 26 within the wearable member, the radio frequency transmitter 26 of the wearable member 14 will be electrically charged sufficiently by the retained power within the battery 22, to enable the radio frequency transmitter 26 to operate for a period of months or possibly years, without a need for recharge or replacement of the battery 22.

As discussed above, the same cannot be said for the mobile phone 18 that will likely need to be charged on a daily or bi-daily basis. As such, it is expected that significant periods of time will pass when the wearable member 14 is spatially separated from the mobile phone 18.

To commence the third protocol, the user pushes the first actuator 30 that causes the radio frequency transmitter 26 to begin transmitting a pre-programmed signal to the mobile phone 18. Once the mobile phone 18 receives the signal, the signal sent by the radio frequency transmitter 26 preferably commences a sequence of emergency protocol notifications by the mobile phone 18. In particular, the mobile phone 18 initiates a phone call to the care giver 40, and actuates the speaker phone member 112 so that the care giver 40 can attempt to establish voice communication with the user U. Generally, at this point, the call will be handled similarly to the manner discussed above in connection with the first and second telephone calls. However, because the wearable member (and hence the user) 30 are detached from the mobile phone 18 (which contains a speaker phone) there exists a greater likelihood that care giver 40 will not be able to establish a voice communication with the user, thereby usually requiring the care giver 40 to need to call the friend 136 or an emergency responder 138 evaluate the user's condition.

Figure 10A:
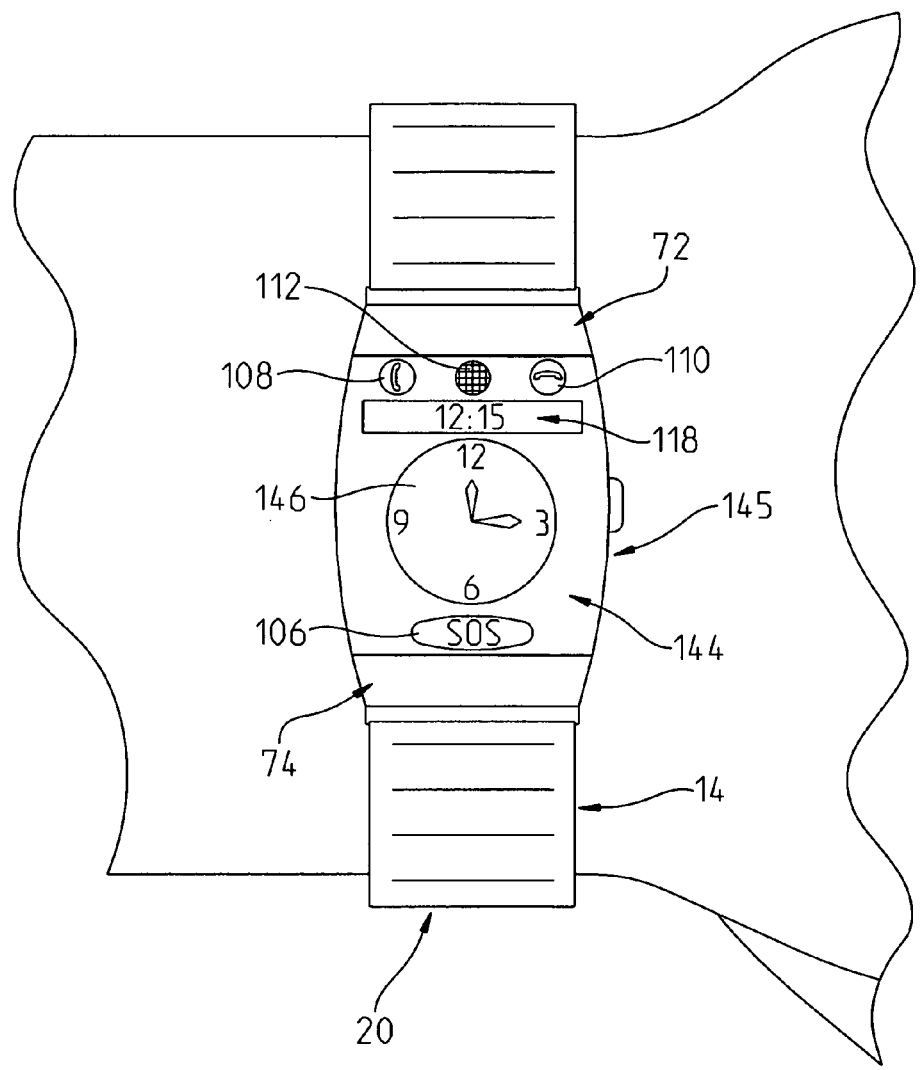
FIG. 10A is a top view of an alternate embodiment emergency alert device.

An alternate embodiment emergency alert device 144 is shown in FIG. 10A. Alternate embodiment device 144 is generally similar the primary device 10 shown in FIGS. 1-9, insofar as it includes a mobile phone member 145, and a wearable member 14. Wearable member 14 can be identical to wearable member 14 shown in FIGS. 1-9. Additionally, the mobile phone member 145 includes a call begin button 108, a call end button 110 and a speaker phone 112. Further, the mobile phone 145 includes a digital time display 118, and an emergency or SOS button 106. A band member 20 is provided for coupling the emergency alert device 144 to a user's wrist. The primary difference resides in the display. Rather than having the touch screen display, the emergency alert device 144 may have just a clock dial-type display 146 that conceivably could be a display similar to the dial display found on many wristwatches.

The substitution of the display 146 for the display shown in FIGS. 1-9 would impact the functionality of the device as, in its purest form, the device 144 shown in FIG. 10A may not have the capability to call out, that the device 10 shown in FIG. 1 possesses. However, this is not all bad, as many users and especially older and technology averse users prefer a device that is less complicated, and thereby less intimidating.

Figure 11:
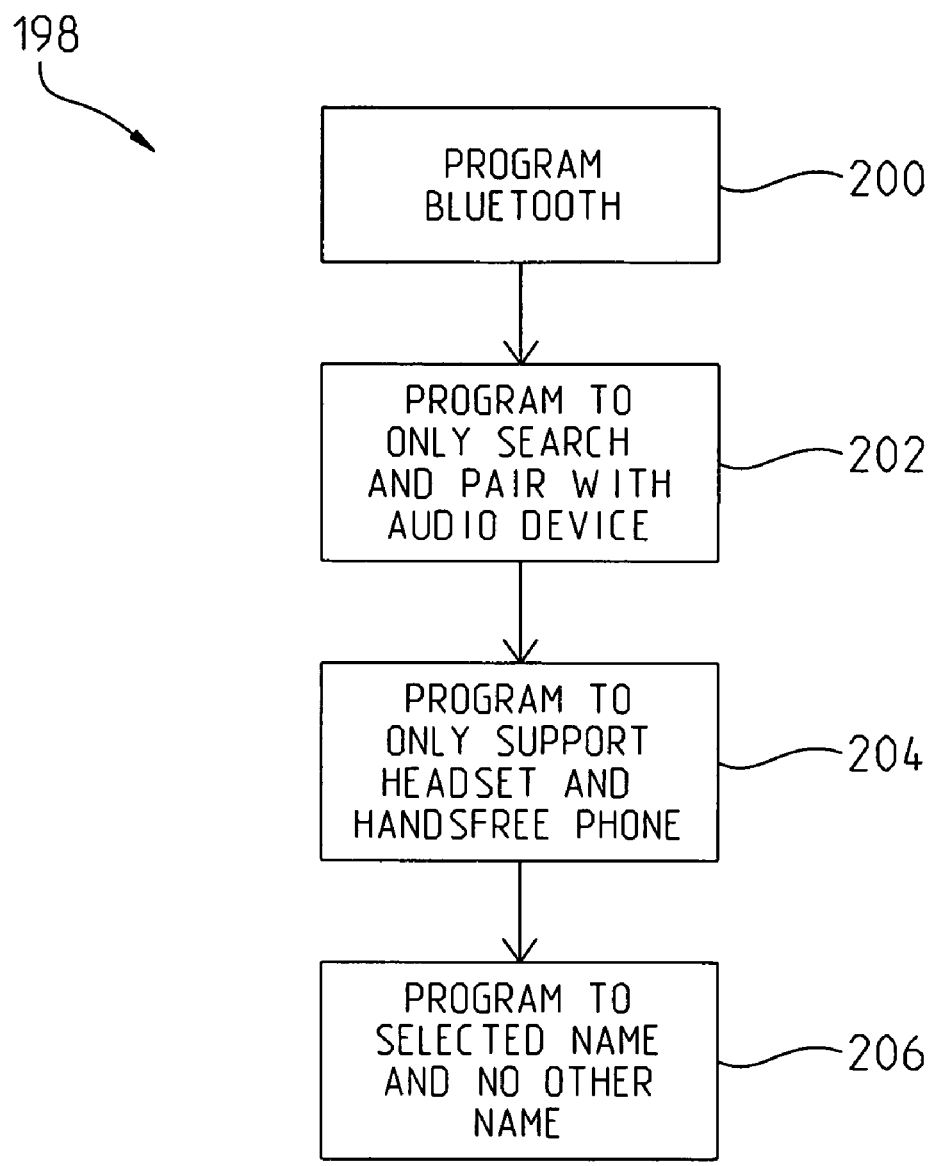
FIG. 11 is a flow chart relating to the programming for communication between the mobile phone of the present invention and a blue tooth ear pieces.

Turning now to FIG. 11, a programming flow chart is shown that relates to the blue tooth feature of the device, that is used to connect the device 10 to, for example, a blue tooth headset 124, as shown in FIG. 2.

The first step in the protocol 198 for programming the blue tooth receiver 200 is to program the device only to search and pair with an audio device. By programming the cell phone 18 to only search and pair with an audio device, the operation is made more simple. Additionally, as shown in Box 204, the cell phone 18 should be programmed to only support the headset and hands free profile. By reducing the number of options to which the device can be programmed, one reduces the likelihood of the device being mis-programmed or mis-set to a non-desirable function, to thereby not operate in the proper manner when so requested. Additionally, the cell phone 18 and blue tooth headset 200 should be programmed to only connect with each other, and no other.

A primary object of this program is to limit the options of the operation of the blue tooth device 124 with respect to the mobile phone 18. By reducing the flexibility of the blue tooth device 124, one helps to ensure that it will remain true to its programming function to operate in an emergency, and that it will not be mis-directed, and hence not work by being changed from its emergency device functionality to some other functionality that would not be appropriate for its emergency alert function.

Turning now to FIG. 12, the protocol will be explained for those situations, such as the first and second protocols wherein the emergency caller is actuated by the user pressing the SOS button on the band as shown in Box 212. The first and third protocols 210 commence by the user pressing the first actuator button on the wearable member 20, as shown in Box 212. As described above, this occurs either by a direct press of the SOS button 30, or else by pressing the mobile phone 18 to engage the SOS button 30.

This results in the first radio frequency device sending a radio transmission signal to the phone unit as shown at Box 214. This causes the mobile phone unit 18 to send a pre-recorded message to the help center 216, that might consist of anything from an open phone line being established between the user and the help center, and a pre-recorded message telling the help center the name, address and other information about the person (user) who is initiating the message.

If the device 10 is equipped with a GPS, the radio frequency transmitter within the wearable member 14 will also send a signal to the GPS, that is designed into and a part of the cell phone 18, to activate the GPS, to obtain a location of the user, as indicated at Box 220. As acquiring a GPS location requires a line of sight to be established between the GPS receiver and the GPS satellite, it is envisioned that in many situations, the GPS location that will be sent to the data help center as shown at Box 222, will comprise not current, but historical data, based upon the last GPS reading. In such a case, the data sent from the device to the help center as shown at Box 216, should indicate that the device is historic, and should also indicate the time at which the last reading was taken. Fortunately, the use of historic data can be minimized through the use of enhanced GPS that is capable of operating through a combination of both geo-positioning signals, and mobile phone signal triangulation, to establish a GPS location, even when the GPS device is not in direct line of sight communication with the GPS satellite. At the same time, the device 18 should also turn on the headset or speaker phone as shown at box 225 to facilitate verbal communication.

Once the help center receives the information from the user, relating to both user information and GPS information (or one of the two), the help center then attempts to talk to the user as shown at Box 218. If verbal communication can be established between the help center and the user, the issue can be resolved over the phone. If the issue can be resolved, such as in a determination that the user does not need help due to a false call, the call can be ended as shown at Box 32. However, if the problem cannot be resolved over the phone, the help desk center will next attempt to contact a friend as shown at Box 228.

Additionally, if the user U is unable to talk to the care giver 40, the help center will then usually attempt to contact a friend as shown at Box 228. If the friend cannot be contacted, the help center will directly try to contact an emergency responder as shown at Box 234. Additionally, if the friend goes to the user's house and finds the user in distress, the friend may attempt to contact an emergency responder. Further, if the help center cannot resolve the user's issue over the phone, the help center can either contact the friend, as shown at Box 228 or an emergency responder as shown at Box 234.

Figure 13:
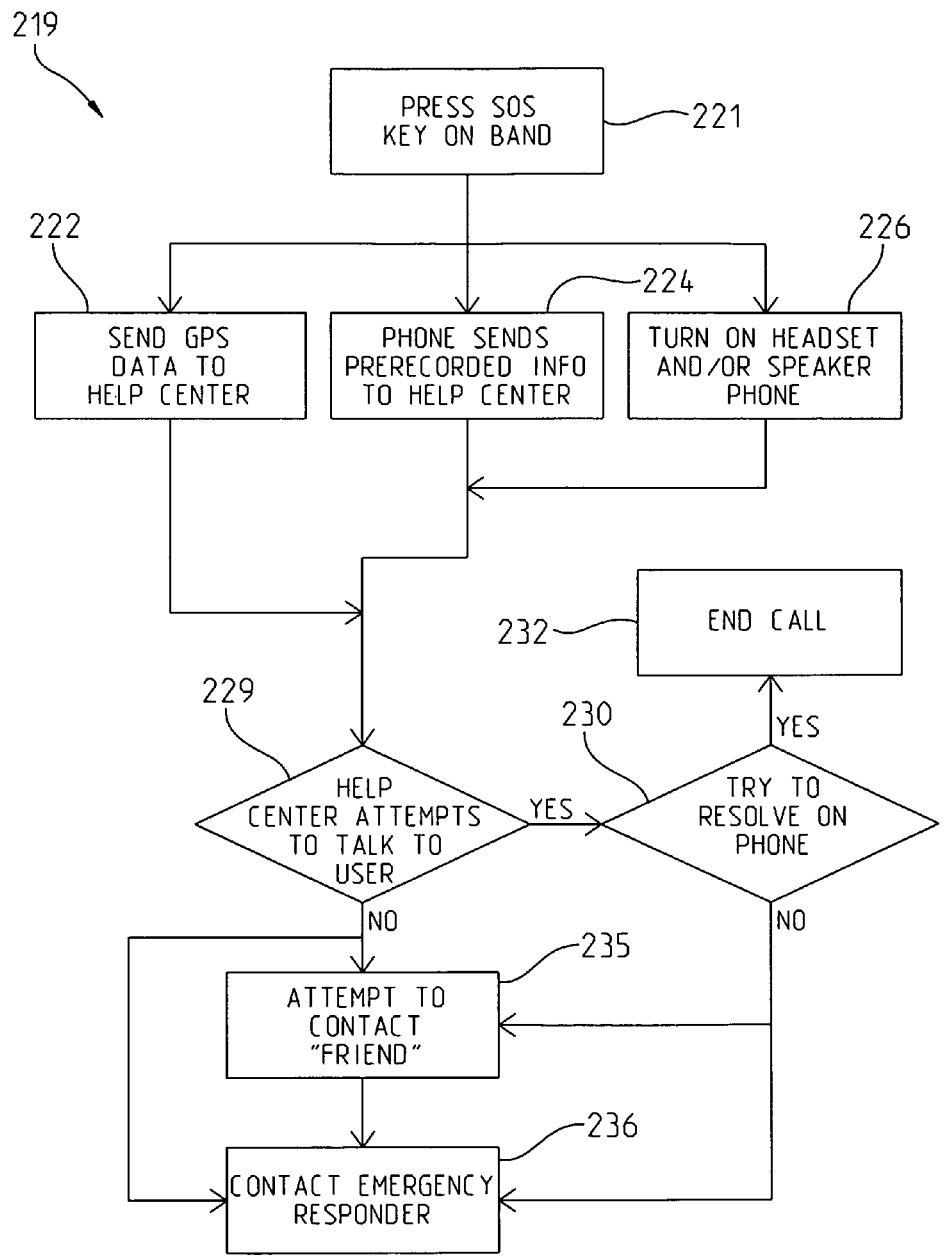
FIG. 13 is a schematic representation of the procedure by which an emergency alert is performed using the device of the present invention when the emergency alert is actuated by the user pressing an emergency button on the mobile phone member.

A flow diagram is shown at FIG. 13 which diagrammatically represents the third protocol 219 where the emergency SOS button is pressed on the phone, as shown at Box 221, to begin the protocol sequence. Upon the emergency actuator being pressed on the mobile phone, the GPS functionality of the device (if it contains one) is actuated as shown at Box 222 so that GPS data relating to the location of the user can be sent to the help center or care giver. Concurrently, the mobile phone 18 sends information to the help center, as shown at Box 224. This material can include a prerecorded message, can include information about the identity of the user, and/or can comprise the opening up of a voice line for communication between the help center and the user.

Concurrently therewith, if the headset 124 is being used and/or if the speaker phone element 112 is being used, the blue tooth/speaker phone is turned on to facilitate voice communication between the help center and the user.

When the help center has received the call, the first thing that is done is that the help center attempts to talk to a user, as shown at Box 229. If communication can be established, the help desk user tries to understand more about the problem, or resolve the issue over the telephone, as shown at Box 233. If the help center desk is capable of resolving the problem, or learning that the problem was indeed a false alarm, the call can be ended as illustrated at Box 232. However, if no contact is made with the user of a voice communication type, or the problem is not resolved, the help center will then attempt to contact a friend as illustrated at box 235. The friend is the first line of defense, as it is hoped that the friend will be able to get to the user quickly to render any aid necessary to the user or at least to help determine the condition of the user.

If the friend is unable to take care of the problem, the next step is to contact the emergency responder 236. The emergency responder 236 can be contacted either by the help center or by the friend. In certain circumstances, the help center will contact the emergency responder before contacting a friend. This would occur if the help center recognizes that the user has an issue that requires the help of an emergency responder, such as a fire or emergency medical care. Alternately, the help center may contact the emergency responder if the help center is unable to contact a friend. Alternately, the friend may decide to contact the emergency responder if the friend goes over, and evaluates the user as needing the help of an emergency responder.

Figure 14:
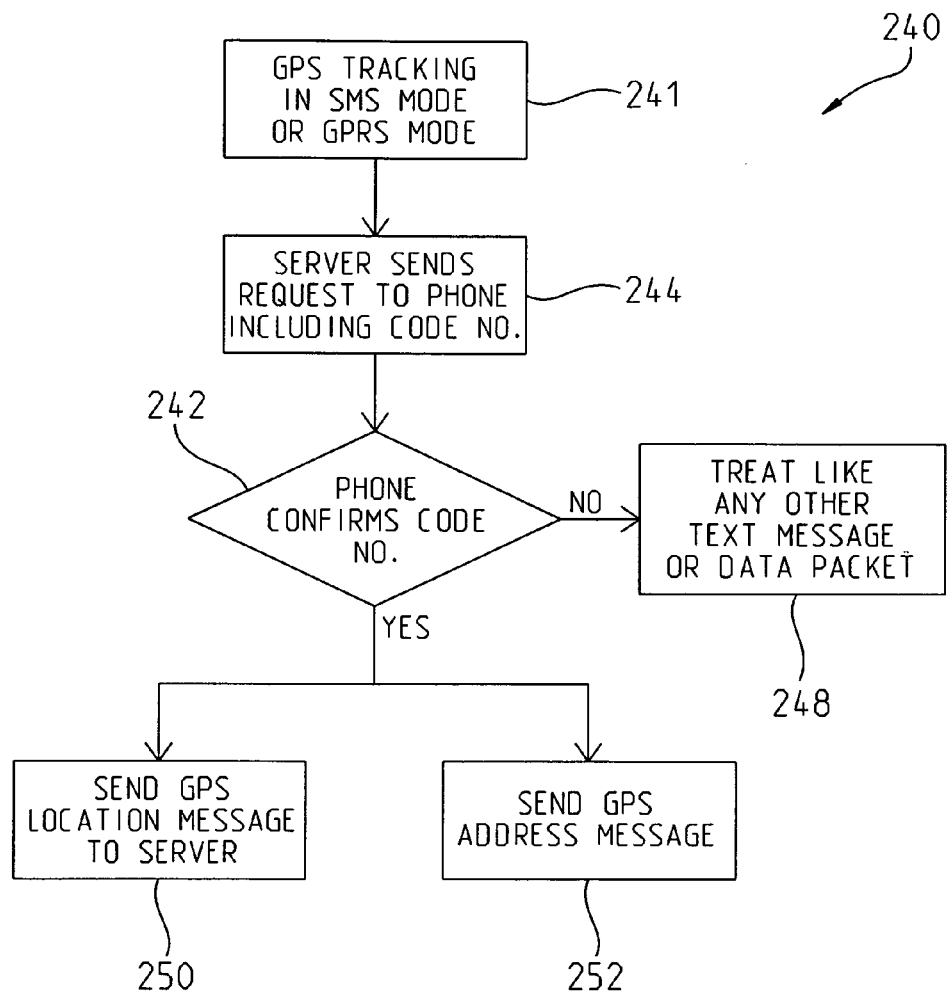
FIG. 14 is a schematic representation of the method by which the emergency alert device of the present invention can provide user location information to a third party pursuant to a request made by a third party.

Turning now to FIG. 14, a protocol is shown whereby the device of the present invention can provide location information to a server about the location of a particular user. Although the information is ultimately provided to a server, it will be appreciated that a third party who was authorized to do so, may access the server to obtain information about the user. In this protocol 240, the GPS tracking is capable of conveying information to a third party, via the mobile phone, either in an SMS mode, or in a GPRS mode as shown at box 241.

To initiate the protocol, a server sends a request to the phone, to request that the phone 18 provide the GPS information to the server.

As shown in Box 244, this information includes a code number that represents an authorization code. The processor within the phone, as shown at Box 242, then confirms the code number to ensure that it is an appropriate code number that authorizes and commands a request for the GPS information.

If there is no confirmation of the appropriate code number, the message that comes in from the server is treated like any other text message or data packet as shown at Block 248. For example, if someone sends an ordinary text message to the user, the phone 18 will not have any code number to confirm, and thus will shove the test message onto the text message display screen, just like any other text message.

However, if the code if confirmed, the phone can then send a GPS location message to the server as shown at Box 250, or alternately, send GPS address message, as shown at box 252 to the user. If this "location request" procedure is done at frequent intervals, the server will possess a relatively current set of location information about the one or more users served by the system and polled by the server. This information can then be obtained from the server by parties who need to know, and are authorized to know the information.

The type of information that is shown in a GPS location data is shown at FIG. 17. Location data is dependent upon the reception of a signal from the GPS satellites. Such satellites normally require a line of sight reception with the receiver, mandating that the receiver be "out of doors" and not covered under a roof. As such, if the cell phone 18 is kept under a roof, the last known GPS acquired position of the cell phone 18 may not be the current position. As such, if the GPS information is not fresh, the GPS status will indicate that data being given is not current, but rather is the last known position of the user. As also discussed above, enhanced GPS is used by many mobile phones 18 to help overcome this problem by using cell phone tower triangulation in addition to information from the GPS satellite, to fix position.

Unfortunately, times exist when a GPS is in an error state. If this is the case, such an error message will be given.

Further, the GPS location device information that is being sent out can include information relating to alarm types, such as the SOS mode, and information as to whether any particular batteries are low. Further, the information should include some identification information, such as the phones IMEI number so that the server can appropriately identify the GPS location information being given to ensure that it matches up with the user.

FIG. 18 shows the GPS address message information data typically given. GPS address message 260 provides much of the same information but largely in a different format. The GPS address information, rather than giving location in terms of latitude and longitude, will be given in terms of street, name and number, state, province, district name, city name, post code and country.

Turning now to FIG. 15, a protocol 264 is shown for a remote GPS tracking by a friend, in the SMS mode, as displayed in Block 266. To enable a friend to track the particular user, the friend can send a GPS request to the phone 18 of the user. This request includes code information, and is sent via an SMS protocol to the user's phone 18, as is shown in Box 268.

The user's phone 18 confirms that the code is an authorized friend, as illustrated in Box 270. If this attempt to confirm is not successful, the SMS message sent by whichever party may have sent it is treated just like any other text message, as shown in Box 276. Therefore, if one were to send a text message rather than a GPS request via the SMS protocol, the text message would be then shunted to the text message display screen of the user's phone 18.

However, if the phone confirms that it has received an SMS-based GPS tracking request, along with the appropriate code, the GPS information will then be sent to the friend, as shown in Box 272. As shown in Box 272, one way to send the friend the information is to send the information as a Google Map Link. If the user has a Smart Phone (PDA) and uses said Smart Phone to send the message, the Google Map link can likely be used by the friend to produce a Google Map, thereby giving the friend information on a map as far as the location of the user. Alternately, the information sent to the user can be sent to the friend as SMS-based address information as shown in Box 274, and as also illustrated in FIG. 18 and discussed above.

A protocol 290 for providing GPS tracking information to a remote server by the device is shown in FIG. 16. The protocol shown in FIG. 16 allows GPS tracking by a remote server shown in Box 292. In this protocol, the sender first sends a request for a GPS location to the user's phone number with an authorization code attached to the request, as shown in Box 294. The user's phone then confirms that the server's code is authentic, as shown in Box 262. If confirmation is not successful, the request for information is treated like any other SMS message. However, if the authorization code is confirmed, GPS information is sent to the remote server. It can be sent as a location message as shown in Box 300, an address message as shown in Box 302, or as an Internet map link as shown in Box 304.

Having described the invention in detail with reference to certain embodiments, it will be appreciated that the invention is limited not by the disclosure set forth above, but only by the scope and spirit of the claims set forth below.

What is claimed:

1. A wearable emergency alert device comprising a wearable member and a separately encased mobile phone member selectively attachable to the wearable member, the wearable member including an attachment member for attaching the wearable member to a body part of a user, a first transmitter for sending a first signal to the mobile phone member, a power source for the first transmitter, and a first actuator operable by a user for actuating the first transmitter to send a signal to the mobile phone member, the mobile phone member including a mobile phone transceiver for establishing a first communication link between the mobile phone transceiver and the first transmitter, and a second communication link between the mobile phone transceiver and a remote receiver for transmitting and receiving at least one of data, voice and messages between the mobile phone transceiver and the remote receiver, a mounting member for selectively removably mounting the mobile phone member to the wearable member, and while the mobile phone member is mounted to the wearable member, permitting the mobile phone member to move between a first position wherein the mobile phone member does not engage the first actuator of the wearable member, and a second position wherein the mobile phone member engages the first actuator to cause the first actuator to actuate the first transmitter to transmit the first signal to the mobile phone transceiver.

2. The wearable emergency alert device of claim 1 wherein the attachable member comprises a wrist band and the wearable member includes an outwardly facing surface wherein the first actuator comprises a depressible switch facing outwardly from the outwardly facing surface.

3. The wearable emergency alert device of claim 2 where the first transmitter comprises a radio frequency transmitter actuable by the first actuator between a normally off position where no signal is being transmitted and an on position where a radio signal is transmitted to the mobile phone transceiver.

4. The wearable emergency alert device of claim 2 wherein the mobile phone member includes a first surface and a second surface, the second surface including at least one control member for controlling operation of the mobile phone.

5. The wearable emergency alert device of claim 4 wherein the control member includes an emergency alert control member for causing the mobile phone to begin an emergency alert notification procedure, and wherein the display member includes a time display function.

6. The wearable emergency alert device of claim 5 wherein the control member includes a phone call begin member and a phone call end member, and the display member includes a touch screen dial pad function.

7. The wearable emergency alert device of claim 5 wherein the mobile phone includes a speaker phone, and wherein the emergency alert control member causes the mobile phone to begin an emergency alert procedure that includes automatically placing a call to a help desk operator and actuating the speaker phone for permitting a user to communicate by voice with the help desk.

8. The wearable emergency alert device of claim 7 wherein the help desk operator comprises at least one of an emergency call center based operator, an emergency responder operator and a friend, and wherein the device includes an accelerometer capable of detecting a fall by the user and reporting the fall to the help desk operator.

9. The wearable emergency alert device of claim 7 wherein the mobile phone includes a GPS function, wherein the emergency control member causes the mobile phone to begin an emergency alert procedure that includes using the GPS function to send the user's location data to the help desk.

10. The wearable emergency alert device of claim 1 wherein the device includes an accelerometer capable of detecting a fall by the user and reporting the fall to the help desk, and the mobile phone includes a GPS function.

11. The wearable emergency alert device of claim 1 wherein the mobile phone include a GPS reporting function including a receiver capable of receiving a message from a third party, a confirming function capable for determining whether the third party is a party authorized to receive GPS information about the user, and a transmitter for transmitting location data about the user's location derived from the GPS function.

12. The wearable emergency alert device of claim 10 wherein the GPS function includes a GPS status determining function to determine current GPS status data for determining whether current GPS data possessed by the GPS function comprises current location data, last known position GPS data, or data derived from a malfunction of the GPS function, and wherein the GPS function includes a report function for reporting location data of the user that includes current GPS status data.

13. The wearable emergency alert device of claim 1 wherein the first transmitter comprises a radio frequency transmitter actuable between a normally off state where no signal is being transmitted and an on state where a signal is transmitted from the radio frequency transmitter to the mobile phone transceiver.

14. The wearable emergency alert device of claim 1 further comprising a charger having a coupling for electrically coupling the mobile phone transceiver to the charger and wherein the mobile phone is fully detachable from the wearable member to permit the wearable member to be positioned remotely from the cell phone transceiver, but within a signal transmission range of the radio frequency transmitter.

15. The wearable emergency alert device of claim 1 wherein the alert device is capable of sending an emergency signal to a care provider in each of a first, second, and third signaling protocol wherein the first signaling protocol includes the mobile phone member being mounted to the wearable member by the mounting member, the mobile phone member being moved to and from the first position to the second position to engage the first actuator of the wearable member, wherein the engagement of the first actuator causes the first transmitter to transmit the first signal to the mobile phone transceiver, and wherein the first signal actuates the mobile phone transceiver to transmit a mobile telephone signal to a care giver.

16. The wearable emergency alert device of claim 15 where the second signaling protocol includes the mobile phone member including a control member for controlling operation of the mobile phone and a speaker phone, and wherein the second signaling protocol includes actuation of the control member by a user to begin the second emergency alert protocol procedure that includes automatically placing a call to a remote care giver and activating the speaker phone for permitting voice communication between a user and a care giver.

17. The wearable emergency device of claim 16 wherein the third signaling protocol includes the mobile phone member being detached from, and remotely positioned from the wearable member, wherein the third emergency alert signaling protocol is commenced by a user actuating the first actuator to cause the first transmitter to send a radio signal to the remote mobile phone transceiver, wherein reception of the radio signal causes the mobile phone transceiver to automatically commence a mobile telephone call between the mobile phone transceiver and a care giver.

18. The wearable emergency alert device of claim 17 wherein at least one of the wearable member and the mobile phone member include a global positioning device for determining a location of the at least one of the wearable member and mobile phone member, and wherein each of the first, second and third signaling protocols include attempts to send user location data to a care giver.

19. The wearable emergency device of claim 1 wherein the device is capable of sending an emergency signal in each of a first, a second and a third emergency signaling protocol, wherein the third signaling protocol includes the mobile phone member being detached from, and remotely positioned from the wearable member, wherein the third emergency signaling protocol is commenced by a user activating the first actuator to cause the first transmitter to send a radio signal to the remote mobile phone transceiver, wherein reception of the radio signal causes the mobile phone transceiver to automatically commence a mobile telephone call between the phone transceiver and a care giver.

20. The wearable emergency alert device of claim 1 wherein the device is capable of sending an emergency signal to a care provider in each of a first, second and third signal protocol, and wherein at least one of the wearable member and phone member include a global positioning sensor device for determining a location of the at least one of the wearable member and mobile phone member, and wherein each of the first, second and third signal protocol includes using the global positioning sensor device to attempt to provide user location data to a care giver.

\* \* \* \* \*